United States Patent
Gelbrich et al.

(10) Patent No.: US 12,516,201 B2
(45) Date of Patent: Jan. 6, 2026

(54) AQUEOUS COATING COMPOSITION FOR DIPCOATING ELECTRICALLY CONDUCTIVE SUBSTRATES CONTAINING BISMUTH AND LITHIUM

(71) Applicant: BASF Coatings GmbH, Münster (DE)

(72) Inventors: Thorsten Gelbrich, Muenster (DE); Patrick Keil, Muenster (DE); Andrea Hoene, Muenster (DE); Andre Brosseit, Muenster (DE); Justina Muehlmeyer, Muenster (DE); Susanne Hemker, Muenster (DE); Petra Toboll, Muenster (DE); Nina Fittkow, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 1044 days.

(21) Appl. No.: 17/603,092

(22) PCT Filed: Mar. 20, 2020

(86) PCT No.: PCT/EP2020/057762
§ 371 (c)(1),
(2) Date: Oct. 12, 2021

(87) PCT Pub. No.: WO2020/212074
PCT Pub. Date: Oct. 22, 2020

(65) Prior Publication Data
US 2022/0177715 A1    Jun. 9, 2022

(30) Foreign Application Priority Data
Apr. 15, 2019  (EP) .................................. 19169240

(51) Int. Cl.
  *C09D 5/44*   (2006.01)
  *C09D 7/61*   (2018.01)
(52) U.S. Cl.
  CPC ......... *C09D 5/4492* (2013.01); *C09D 5/4496* (2013.01); *C09D 7/61* (2018.01)
(58) Field of Classification Search
  CPC ...... C09D 5/4492; C09D 7/61; C09D 5/4496; C09D 5/106; C09D 5/448; C09D 5/4465; C09D 5/24; C09D 5/4453; C09D 5/4469; C09D 7/62; C09D 5/4488; C09D 5/08; C08K 9/06; C08K 2201/001; C08K 2003/0893; C08K 2003/0812; C08K 3/08; C25D 13/10; C25D 13/12; C25D 13/18
See application file for complete search history.

(56) References Cited

U.S. PATENT DOCUMENTS

| | | | |
|---|---|---|---|
| 5,554,700 A | 9/1996 | Schipfer et al. | |
| 5,702,581 A | 12/1997 | Kerlin et al. | |
| 5,908,912 A | 6/1999 | Kollah et al. | |
| 9,493,660 B2 | 11/2016 | Gross-Brinkhaus et al. | |
| 10,407,578 B2 | 9/2019 | Czika et al. | |
| 2005/0234149 A1 | 10/2005 | Grosse-Brinkhaus et al. | |
| 2005/0240042 A1 | 10/2005 | Hartung et al. | |
| 2016/0280935 A1* | 9/2016 | Czika ................... | C09D 5/4488 |
| 2019/0330745 A1 | 10/2019 | Birkenheuer et al. | |
| 2020/0399479 A1* | 12/2020 | Zawacky ................. | C09D 7/61 |

FOREIGN PATENT DOCUMENTS

| | | |
|---|---|---|
| DE | 102017210358 A1 | 12/2017 |
| EP | 0079629 A1 | 5/1983 |
| EP | 1000985 A1 | 5/2000 |
| EP | 0642558 B2 | 10/2001 |
| EP | 2405035 A1 | 1/2012 |
| JP | 2011057944 A | 3/2011 |
| WO | 1995007319 A1 | 3/1995 |
| WO | 2004018570 A2 | 3/2004 |
| WO | 2004018580 A1 | 3/2004 |
| WO | 2009021719 A2 | 2/2009 |
| WO | 2010112605 A1 | 10/2010 |
| WO | 2015070930 A1 | 5/2015 |
| WO | 2015070931 A1 | 5/2015 |

OTHER PUBLICATIONS

International Search Report for corresponding PCT/EP2020/057762 mailed May 26, 2020, 2 Pages.
European Search Report for EP Patent Application No. 19169240.9, Issued on Oct. 16, 2019, 3 pages.

* cited by examiner

*Primary Examiner* — Xiuyu Tai
(74) *Attorney, Agent, or Firm* — Armstrong Teasdale LLP

(57) ABSTRACT

Described herein is an aqueous coating composition (A) for at least partly coating an electrically conductive substrate with an electrocoat material, including (A1) at least one cathodically depositable resin binder, (A2) at least one crosslinking agent, (A3) at least 100 ppm of bismuth, based on the total weight of the coating composition (A), and (A4) lithium, in a form dissolved in (A), the lithium not exceeding a fraction of 300 ppm, based on the total weight of the coating composition (A). Also described herein are a method for producing (A), a coating method, and an at least partly coated substrate obtainable by the method.

20 Claims, No Drawings

AQUEOUS COATING COMPOSITION FOR DIPCOATING ELECTRICALLY CONDUCTIVE SUBSTRATES CONTAINING BISMUTH AND LITHIUM

CROSS-REFERENCE TO RELATED APPLICATIONS

This application is a U.S. National Phase Application of International Patent Application No. PCT/EP2020/057762, filed Mar. 20, 2020, which claims priority to European Patent Application No. 19169240.9, filed Apr. 15, 2019, the entire contents of which are hereby incorporated by reference herein.

The present invention relates to an aqueous coating composition (A) comprising at least one cathodically depositable binder (A1), at least one crosslinking agent (A2), a total amount of at least 100 ppm of Bi (A3), based on the total weight (A), and also lithium (A4), in a form dissolved in (A). The aqueous coating composition (A) is suitable especially for at least partly coating an electrically conductive substrate—that is, then, in particular, as an electrocoat material. The present invention also relates to a method for producing (A), to a method for coating an electrically conductive substrate with a coating composition (A), and to a coated substrate obtainable by this method.

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose.

A disadvantage of the known coating methods, particularly affecting the known methods employed within the automobile industry, is that these methods normally envisage a conversion coating step, as for example a phosphatizing step, as a pretreatment, in which the substrate for coating, after an optional cleaning step and before a deposition coating step, is furnished with a conversion coating in order to ensure sufficient corrosion prevention. In the case of phosphatizing, this treatment is with a metal phosphate such as zinc phosphate. This pretreatment normally entails implementation of a plurality of method steps in a plurality of different dipping tanks with different heating. During the implementation of such pretreatment, moreover, waste sludges are produced, which burden the environment and have to be disposed of. On environmental and economic grounds, therefore, it is especially desirable to be able to forego such a pretreatment step, but nevertheless to achieve at least the same corrosion prevention effect as achieved using the known methods.

EP 2 405 035 A1 and JP 2011-057944 A each disclose an electrophoretically depositable coating composition comprising 100 to 1000 ppm and 100 to 5000 ppm, respectively, of trivalent bismuth ions, and an aminopolycarboxylic acid in 0.5 to 10 times and 0.1 to 5 times, respectively, the molar concentration, based in each case on the molar concentration of the trivalent bismuth ions. Within the coating compositions disclosed therein, the trivalent bismuth ions are in dissolved form. A disadvantage of the coating compositions known from EP 2 405 035 A1 and JP 2011-057944 A, however, is that it is first necessary in a separate, upstream process step to prepare a corresponding, water-soluble, bismuth-containing compound capable of releasing the trivalent bismuth ions, starting from water-insoluble bismuth precursor compounds such as bismuth oxide and from suitable aminopolycarboxylic acids as complexing agents. This water-soluble, bismuth-containing compound, prepared accordingly, is only then added to the coating composition. Bismuth salts of this kind in solution in water, which following their preparation are put into a coating composition which is electrophoretically depositable on application of a voltage in a range of 100-400 V, are known from EP 1 000 985 A1, moreover. The U.S. Pat. No. 5,908,912 as well describes similar systems, with the soluble Bi-containing compounds in this case being generated using amino acids and amino acid precursor compounds.

Cathodically depositable bismuth-containing coating compositions which can be deposited onto a suitable substrate in a one-stage coating step are known for example from WO 2009/021719 A2, WO 2004/018580 A1, WO 2004/018570 A2, EP 0 642 558 B2, and also WO 95/07319 A1: The addition of water-insoluble bismuth subnitrate to electrophoretically depositable coating compositions is known from WO 2009/021719 A2. The bismuth subnitrate used functions in this case as a crosslinking catalyst. Known from WO 2004/018580 A1 is the use of water-insoluble bismuth subsalicylate in coating compositions. The use of bismuth subsalicylate or bismuth ethylhexanoate in coating compositions as a bactericide is described in WO 2004/018570 A2. Water-soluble bismuth compounds are known, moreover, from EP 0 642 558 B2 and also WO 95/07319 A1.

WO 2015/070930 A1 describes an electrocoat material and also a method, more particularly a two-stage method, for coating an electrically conductive substrate with the electrocoat material. The electrocoat material in this case comprises Bi in both dissolved and undissolved forms. In spite of the omission of conversion coating (usually phosphatizing), which is generally carried out with metallic substrates and is considered obligatory for corrosion prevention, the resulting electrocoat systems display a corrosion inhibition effect which is already very good.

In spite of this there continues to be a demand for electrophoretically depositable coating compositions, for the coating of electrically conductive substrates with an electrocoat material, which, particularly with regard to omitting the typically implemented phosphatizing step as a pretreatment, exhibit an outstanding—particularly on different metal substrates—corrosion prevention effect. The intention, then, is that the advantages of a coating method advantageous economically and environmentally, because of the omission of the phosphatizing, should be combined with corrosion prevention that represents a further improvement on the systems described in WO 2015/070930 A1.

WO 2010/112605 A1 describes a coating composition which can be cured at low temperatures and which comprises a lithium salt. The fraction of the lithium salt lies in orders of magnitude of several percent by weight, based on the total amount of the composition. Electrophoretically depositable compositions are not described.

It is an object of the present invention, therefore, to provide a cathodically depositable coating composition, for the coating of an electrically conductive substrate, that exhibits advantages over the coating compositions known from the prior art. A more particular object of the present invention is to provide coating compositions which enable more economic and/or more environmental coating methods than conventional coating compositions employed. In particular, moreover, it is an object of the present invention to provide a method which enables more economic and/or more environmental coating than conventional coating methods—that is, which makes it possible, for example, to do without the phosphatizing, which is normally to be carried out by means of a metal phosphate prior to deposition coating, such a method nevertheless enabling a further-improved corrosion protection effect, including on different substrates. Here it must be borne in mind, moreover, that the cathodic deposition of the composition is easily implementable and also that curing can take place in a manner typical for cathodic electrocoat systems.

This object is achieved by the subject matter claimed in the claims and also by the preferred embodiments of that subject matter that are described in the description hereinafter.

A first subject of the present invention is therefore an aqueous coating composition (A) for at least partly coating an electrically conductive substrate with an electrocoat material, comprising
- (A1) at least one cathodically depositable resin binder,
- (A2) at least one crosslinking agent,
- (A3) at least 100 ppm of bismuth, based on the total weight of the coating composition (A), wherein
- (A4) the coating composition comprises lithium, in a form dissolved in (A), said lithium not exceeding a fraction of 300 ppm, based on the total weight of the coating composition (A).

The aqueous coating composition (A) of the invention therefore serves particularly for producing an electrocoat on a surface of an electrically conductive substrate.

Further subject matter of the invention, as for example methods and uses which make use of the coating composition of the invention, are apparent from the disclosure hereinafter, particularly from the description and the claims.

It has surprisingly been found that the aqueous coating composition (A) of the invention, particularly when used in a method for coating an electrically conductive substrate with an electrocoat material, makes it possible to be able to forgo the step normally needing to be carried out prior to deposition coating, more particularly electrocoating, namely the step of pretreating the electrically conductive substrate for at least partial coating with a metal phosphate such as zinc phosphate, in order to form a metal phosphate coat on the substrate, thereby allowing the coating method in question to be made overall not only more economic, more particularly less time-consuming and cost-intensive, but also more environmental than conventional methods. Nevertheless, the corrosion prevention effect achieved even on different substrates, as for example both steel-based and aluminum-based substrates, is outstanding, and the possibilities both for cathodic deposition and for curing under conditions of cathodic deposition coatings are optimum.

It has further been found that a method, particularly a two-stage method, for coating an electrically conductive substrate using the coating composition of the invention allows the advantages cited above to be manifested particularly well.

Aqueous Coating Composition

The coating composition of the invention is aqueous. The term "aqueous" in connection with coating compositions or else dispersion is known in principle. It refers to fluid systems which as solvent (that is, fluid dilution medium) include a significant fraction of water. Of course, however, even aqueous systems may comprise organic solvents in at least minor amounts—for example, as cosolvents with emulsifier function for stabilizing particular constituents such as resins, pigments or additives. It follows from this that the aqueous coating composition (A) of the invention is preferably an aqueous dispersion or solution, preferably an aqueous dispersion. Further details and also preferred implementations in relation to the term "aqueous" are found later on below in the description.

The aqueous coating composition (A) of the invention comprises at least one cathodically depositable resin binder, which is described in more detail below (component (A1)). Accordingly, the coating composition (A) is suitable for coating electrically conductive substrates via the principle of electrocoating, with the composition (A) then being cathodically depositable. With preference, therefore, the coating composition (A) is an electrocoat material.

Component (A1) and Component (A2)

The aqueous coating composition (A) used in accordance with the invention comprises at least one cathodically depositable resin binder (component (A1)) and at least one crosslinking agent as component (A2).

A resin, in agreement with the definition known in principle, is a product which comprises organic constituents, specifically organic reaction products, oligomers and/or polymers. Resins in this context feature a more or less broad distribution of the molar masses and in general can be employed as binders in coating compositions. After a coating composition of this kind, applied to a substrate, has cured, therefore, the resins are part of the polymeric network of a coating film. For reasons of clarity, the term "binder" in the context of the present invention is used in relation to the cathodically depositable resin and not in relation to, for example, additives or crosslinking agents (despite the fact that in general such additives and crosslinking agents are considered part of the nonvolatile fraction, exclusive of pigments and fillers, of the coating film and therefore, according to the standard definition, belong to the binder fraction). The terms "resin binder" and "binder" are therefore equivalent in the context of the present invention.

The coating composition (A) of the invention is preferably prepared using an aqueous dispersion or aqueous solution, more preferably at least one aqueous dispersion, which comprises the at least one cathodically depositable binder (A1) and the at least one crosslinking agent (A2). This aqueous dispersion or solution comprising (A1) and (A2) preferably has a nonvolatile fraction, in other words a solids content, in a range from 25 to 60 wt %, more preferably in a range from 27.5 to 55 wt %, very preferably in a range from 30 to 50 wt %, more preferably still in a range from 32.5 to 45 wt %, more particularly in a range from 35 to 42.5 wt %, based in each case on the total weight of this aqueous dispersion or solution.

Methods for determining the solids content are known to the skilled person. The solids content is determined preferably according to DIN EN ISO 3251 (date: Jun. 1, 2008) in particular over a duration of 30 minutes at 180° C. as per that standard.

The skilled person knows of cathodically depositable binders (A1). The inventively employed binder (A1) is preferably a binder dispersible or soluble in water. All customary cathodically depositable binders known to the skilled person are suitable here as binder component (A1) of the aqueous coating composition (A) of the invention. A binder is cathodically depositable when it comprises functional groups which, fundamentally or under certain conditions, carry positive charges and in this way, if a voltage is applied, lead to the binder migrating to the cathode and being deposited there after neutralization. Examples would include binders having amino groups, in which case, through a suitable choice of pH, it is possible to realize protonation and hence positive charging of the binder. Deposition then takes place by deprotonation and hence neutralization of the amino groups, with formation of hydrogen.

The binder (A1) has reactive functional groups. These groups permit a crosslinking reaction with the crosslinking agent. Accordingly, by virtue of the binder (A1) present and the crosslinking agent (A2) present, the coating composition (A) is thermally crosslinkable (i.e., curable). Preferably the binder (A1) and the crosslinking agent (A2) present are crosslinkable on heating to temperatures above room temperature, in other words above 18-23° C. The binder (A1) and the crosslinking agent (A2) present are preferably crosslinkable at oven temperatures 80° C., more preferably ≥100° C., very preferably 125° C., and especially preferably 150° C. The coating composition (A) is curable preferably at temperatures of 100 to 250° C., more preferably at 125 to 250° C., and very preferably at 150 to 250° C.

Any customary coating-material crosslinking chemistry known to the skilled person is contemplated here. The binder (A1) preferably has reactive functional groups selected from the group consisting of optionally substituted primary amino groups, optionally substituted secondary amino groups, substituted tertiary amino groups, hydroxyl groups, thiol groups, carboxyl groups, groups which have at least one C=C double bond, such as vinyl groups or (meth)acrylate groups, for example, and epoxide groups, it being possible for the primary and secondary amino groups to be substituted by 1 or 2 or 3 substituents in each case independently of one another selected from the group consisting of $C_{1-6}$ aliphatic radicals such as methyl, ethyl, n-propyl or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl)$_2$. Particularly preferred is at least one binder (A1) which has reactive functional groups selected from the group consisting of optionally substituted primary amino groups, optionally substituted secondary amino groups, and hydroxyl groups, it being possible for the primary and secondary amino groups to be substituted optionally by 1 or 2 or 3 substituents in each case independently of one another selected from the group consisting of $C_{1-6}$ aliphatic radicals such as methyl, ethyl, n-propyl, or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl)$_2$. The reactive functional groups here, especially the optionally substituted primary and secondary amino groups, may optionally be present at least partly in protonated form.

With particular preference the binder (A1) has tertiary amino groups optionally present at least partly in protonated form, very preferably tertiary amino groups which in each case independently of one another have at least two $C_{1-3}$ alkyl groups each substituted at least singly by a hydroxyl group, more particularly having in each case independently of one another two hydroxyethyl groups, two hydroxypropyl groups, or one hydroxypropyl and one hydroxyethyl group, the binder (A1) preferably being at least one polymeric resin. Such binders may be obtained, for example, by a method which is described in JP 2011-057944 A.

The binder (A1) present in the coating composition (A) is preferably at least one acrylate-based polymeric resin and/or at least one epoxide-based polymeric resin, more particularly at least one cationic epoxide-based and amine-modified resin. The preparation of cationic, amine-modified, epoxide-based resins of this kind is known and is described in, for example, DE 35 18 732, DE 35 18 770, EP 0 004 090, EP 0 012 463, EP 0 961 797 B1, and EP 0 505 445 B1. Cationic epoxide-based amine-modified resins are understood preferably to be reaction products of at least one optionally modified polyepoxide, i.e., of at least one optionally modified compound having two or more epoxide groups, with at least one preferably water-soluble amine, preferably with at least one such primary and/or secondary amine. Particularly preferred polyepoxides are polyglycidyl ethers of polyphenols and are prepared from polyphenols and epihalohydrins. Polyphenols that may be used include, in particular, bisphenol A and/or bisphenol F. Other suitable polyepoxides are polyglycidyl ethers of polyhydric alcohols, such as ethylene glycol, diethylene glycol, triethylene glycol, 1,2-propylene glycol, 1,3-propylene glycol, 1,5-pentanediol, 1,2,6-hexanetriol, glycerol, and 2,2-bis(4-hydroxycyclohexyl)propane. Modified polyepoxides are those polyepoxides in which some of the reactive functional groups have undergone reaction with at least one modifying compound. Examples of such modifying compounds are as follows:

a) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines having secondary amino groups, e.g., N,N'-dialkylalkylenediamines, such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethylpolyoxypropylenediamine, polyaminoamides, such as Versamides, for example, especially amino-terminated reaction products of diamines (e.g., hexamethylenediamine), polycarboxylic acids, especially dimer fatty acids, and monocarboxylic acids, especially fatty acids, or the reaction product of one mole of diaminohexane with two moles of monoglycidyl ether, or monoglycidyl esters, especially glycidyl esters of α-branched fatty acids, such as of Versatic acid, or c) compounds containing hydroxyl groups, such as neopentyl glycol, bisethoxylated neopentyl glycol, neopentyl glycol hydroxypivalate, dimethylhydantoin-N-N'-diethanol, hexane-1,6-diol, hexane-2,5-diol, 1,4-bis(hydroxymethyl) cyclohexane, 1,1-isopropylidenebis(p-phenoxy)-2-propanol, trimethylolpropane, pentaerythritol, or amino alcohols, such as triethanolamine, methyldiethanolamine, or hydroxyl-containing alkylketimines, such as aminomethylpropane-1,3-diol methyl isobutylketimine or tris(hydroxymethyl)aminomethane cyclohexanone ketimine, and also polyglycol ethers, polyester polyols, polyether polyols, polycaprolactone polyols, polycaprolactam polyols of various functionalities and molecular weights, or d) saturated or unsaturated fatty acid methylesters, which are transesterified in the presence of sodium methoxide with hydroxyl groups of the epoxy resins.

Examples of amines which can be used are mono- and dialkylamines, such as methylamine, ethylamine, propylamine, butylamine, dimethylamine, diethylamine, dipropylamine, methylbutylamine, alkanolamines, such as methylethanolamine or diethanolamine, for example, and dialkylaminoalkylamines, such as dimethylamino-ethylamine, diethylaminopropylamine, or dimethylaminopropylamine, for example. The amines that can be used may also contain other functional groups as well, provided these groups do not disrupt the reaction of the amine with the epoxide group of the optionally modified polyepoxide and also do not lead to gelling of the reaction mixture. Secondary amines are preferably used. The charges which are needed for dilutability with water and for electrical deposition may be generated by protonation with water-soluble acids (e.g., boric acid, formic acid, acetic acid, lactic acid, preferably acetic acid). A further possibility for introducing cationic groups into the optionally modified polyepoxide lies in the reaction of epoxide groups in the polyepoxide with amine salts.

Besides the at least one cathodically depositable binder (A1), the coating composition (A) comprises at least one crosslinking agent (A2) which permits a crosslinking reaction with the reactive functional groups of the binder (A1).

All customary crosslinking agents (A2) known to the skilled person may be used, such as, for example, phenolic resins, polyfunctional Mannich bases, melamine resins, benzoguanamine resins, epoxides, free polyisocyanates and/or blocked polyisocyanates, particularly blocked polyisocyanates.

A particularly preferred crosslinking agent (A2) is a blocked polyisocyanate. Blocked polyisocyanates which can be utilized are any polyisocyanates such as diisocyanates, for example, in which the isocyanate groups have been reacted with a compound and so the blocked polyisocyanate formed is stable in particular with respect to hydroxyl and amino groups, such as primary and/or secondary amino groups, at room temperature, i.e., at a temperature of 18 to 23° C., but reacts at elevated temperatures, as for example at ≥80° C., more preferably ≥100° C., very preferably ≥125° C., and especially preferably ≥150° C., or at 80° C. to 300° C. or at 100 to 250° C., more preferably at 125 to 250° C., and very preferably at 150 to 250° C.

In the preparation of the blocked polyisocyanates it is possible to use any desired organic polyisocyanates that are suitable for crosslinking. Isocyanates used are preferably (hetero)aliphatic, (hetero)cycloaliphatic, (hetero)aromatic, or (hetero)aliphatic-(hetero)aromatic isocyanates. Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diiso-cyanatodipropyl ether, cyclobutene 1,3-diisocyanate, cyclohexane 1,3- and 1,4-di-isocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, deca-hydro-8-methyl-1,4-methanonaphthalen-2 (or 3),5-ylenedimethylene diisocyanate, hexahydro-4,7-methano-indan-1 (or 2),5 (or 6)-ylenedimethylene diisocyanate, hexahydro-4,7-methanoindan-1 (or 2),5 (or 6)-ylene diisocyanate, 2,4- and/or 2,6-hexahydrotolylene diisocyanate (H6-TDI), 2,4- and/or 2,6-tolylene diisocyanate (TDI), perhydro-2,4'-diphenylmethane diisocyanate, perhydro-4,4'-diphenylmethane diisocyanate (H$_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate. Furthermore, mixtures of polyisocyanates may also be utilized. The organic polyisocyanates contemplated as crosslinking agents (A2) for the invention may also be prepolymers, deriving, for example, from a polyol, including from a polyether polyol or a polyester polyol. Especially preferred are 2,4-toluene diisocyanate and/or 2,6-toluene diisocyanate (TDI), and/or isomer mixtures of 2,4-toluene diisocyanate and 2,6-toluene diisocyanate, and/or diphenylmethane diisocyanate (MDI).

Used preferably for the blocking of polyisocyanates may be any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols such as cyclopentanol and cyclohexanol; aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The relative weight ratio of the at least one binder (A1) to the at least one crosslinking agent (A2) in the coating composition (A) used in accordance with the invention is preferably in a range from 4:1 to 1.1:1, more preferably in a range from 3:1 to 1.1:1, very preferably in a range from 2.5:1 to 1.1:1, more particularly in a range from 2.1:1 to 1.1:1, based in each case on the solids content of the at least one binder (A1) and of the at least one crosslinking agent (A2) in the coating composition (A).

In another preferred embodiment, the relative weight ratio of the at least one binder (A1) to the at least one crosslinking agent (A2) in the coating composition (A) used in accordance with the invention is in a range from 4:1 to 1.5:1, more preferably in a range from 3:1 to 1.5:1, very preferably in a range from 2.5:1 to 1.5:1, more particularly in a range from 2.1:1 to 1.5:1, based in each case on the solids content of the at least one binder (A1) and of the at least one crosslinking agent (A2) in the coating composition (A).

As already indicated above, the coating composition of the invention is aqueous. The term "aqueous" in connection with the coating composition (A) refers preferably to liquid coating compositions (A) which comprise water as the main component of their liquid diluent, i.e., as liquid solvent and/or dispersion medium. Of course, however, the coating composition (A) may include at least one organic solvent in minor fractions. Examples of such organic solvents include heterocyclic, aliphatic or aromatic hydrocarbons, mono- or polyhydric alcohols, especially methanol and/or ethanol, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, methylisobutyl ketone, acetone, isophorone, or mixtures thereof. The fraction of these organic solvents is preferably not more than 20.0 wt %, more preferably not more than 15.0 wt %, very preferably not more than 10.0 wt %, more particularly not more than 5.0 wt % or not more than 4.0 wt % or not more than 3.0 wt %, more preferably still not more than 2.5 wt % or not more than 2.0 wt % or not more than 1.5 wt %, most preferably not more than 1.0 wt % or not more than 0.5 wt %, based in each case on the total fraction of the liquid diluents—i.e., liquid solvents and/or dispersion media—that are present in coating composition (A).

The aqueous coating composition (A) preferably has a solids content in the range from 5 to 45 wt %, more preferably in the range from 7.5 to 35 wt %, very preferably from 10 to 30 wt %, more preferably still in the range from 12.5 to 25 wt % or in the range from 15 to 30 wt % or in the range from 15 to 25 wt %, more particularly from 17 to 22 wt %, based in each case on the total weight of the aqueous coating composition (A). Methods for determining the solids content are known to the skilled person. The solids content is determined preferably according to DIN EN ISO 3251 (date: Jun. 1, 2008).

The coating composition (A) of the invention preferably has a pH in a range from 4.0 to 6.5. The coating composition (A) used in accordance with the invention more preferably has a pH in the range from 4.2 to 6.5, more particularly in the range from 4.4 to 6.5 or in the range from 4.6 to 6.5, especially preferably in the range from 4.8 to 6.4, most preferably in the range from 5.0 to 6.2 or 5.2 to 6.0 or 5.5 to 6.0. Methods for adjusting pH levels in aqueous compositions are known to the skilled person. The desired pH is preferably set by addition of at least one acid, more preferably at least one inorganic and/or at least one organic acid. Examples of suitable inorganic acids are hydrochloric acid, sulfuric acid, phosphoric acid and/or nitric acid. An example of a suitable organic acid is propionic acid, lactic acid, acetic acid and/or formic acid. Alternatively or additionally and also preferably it is possible as well to use the at least one component (A3aa) present in the coating composition (A) for adjusting the pH level, provided said component is suitable for the purpose, i.e., has for example at least one deprotonatable functional group such as a carboxyl group and/or a phenolic OH group, for example.

Component (A3)

The coating composition (A) comprises a total amount of (A3) at least 100 ppm bismuth, based on the total weight of the coating composition (A).

Under the term "bismuth", especially in connection with the total amount of bismuth in the coating composition (A) and the component (A3), the present invention preferably understands cathodic bismuth atoms of various valences. The bismuth here may be in trivalent form (Bi(III)), but alternatively or additionally may also be in other oxidation states. The amount of bismuth is calculated in each case as bismuth metal.

The total amount of bismuth in the coating composition (A) is preferably at least 130 ppm or at least 150 ppm or at least 200 ppm, more preferably at least 300 ppm, very preferably at least 500 or at least 750 ppm, more particularly at least 1000 ppm or at least 1500 ppm or at least 2000 ppm, based in each case on the total weight of the coating composition (A). The total amount of bismuth in the coating composition (A) here is preferably in each case at most 20 000 ppm, more preferably at most 15 000 ppm, very preferably at most 10 000 ppm or at most 7500 ppm, more particularly at most 5000 ppm or at most 4000 ppm, based in each case on the total weight of the coating composition (A). The total amount of bismuth in the coating composition (A), based on the total weight of the aqueous coating composition (A), is preferably in a range from 130 ppm to 20 000 ppm, more preferably in a range from 150 ppm to 15 000 ppm, very preferably in a range from 200 ppm to 10 000 ppm, especially preferably in a range from 500 ppm to 10 000 ppm or in a range from 500 to 20 000 ppm or in a range from 1000 ppm to 10 000 ppm or in a range from 1000 ppm to 5000 ppm or in a range from 500 ppm to 3000 ppm. The amount of bismuth, calculated as metal, can be determined by the method described in the working examples (ICP-OES). This is, of course, not necessary if the amounts of bismuth-containing constituents used are known directly and an arithmetic determination is possible.

In one particular embodiment of the present invention, the coating composition (A) comprises at least 130 ppm of bismuth, based on the total weight of the coating composition (A), including (A3a) at least 30 ppm of bismuth, based on the total weight of the coating composition (A), in a form in which it is present in solution in the coating composition (A), and (A3b) at least 100 ppm of bismuth, based on the total weight of the coating composition (A), in a form in which it is not present in solution in the coating composition (A).

The term "form in which it is present in solution" in connection with component (A3a) of the coating composition (A) of the invention is preferably understood such that component (A3a) at a coating composition (A) temperature of 20° C. is present in dissolved form in the coating composition (A). Before it is introduced into the coating composition (A), therefore, component (A3a) is preferably part of a compound of at least limited water-solubility, more particularly of a bismuth salt of at least limited water-solubility. This is self-evident to the skilled person from the fact that the coating composition of the invention is aqueous. By introducing a bismuth salt of at least limited water-solubility into the coating composition (A), at least a part of the bismuth salt is then dissolved, and so the composition then comprises the component (A3a).

Component (A3a) is preferably introduced with the additional use of an at least bidentate complexing agent (A3aa) suitable for the complexing of bismuth. Such a complexing agent will lead in general to a higher fraction of dissolved bismuth than that dictated by the water-solubility of the particular bismuth compound used. Components (A3a) and (A3aa) are therefore preferably in the form of a complex in the coating composition (A). The at least 30 ppm of bismuth present in a form dissolved in the coating composition (A) as component (A3a) are therefore present preferably together with component (A3aa) in the form of a bismuth compound in solution in the coating composition (A), more particularly in the form of at least one complex made up of the components (A3a) and (A3aa). Alternatively and/or additionally, for example, component (A3a) may also be in the form of hydrated bismuth. Trivalent bismuth is preferably present at least partly as component (A3a).

Component (A3a) is preferably obtainable from at least one bismuth compound selected from the group consisting of oxides, basic oxides, hydroxides, carbonates, nitrates, basic nitrates, salicylates and basic salicylates of bismuth, and also mixtures thereof. In this case at least one such bismuth compound is reacted preferably in water in the presence of at least one complexing agent (A3aa) partly to give the component (A3a).

The coating composition (A) comprises preferably at least 50 ppm, more preferably at least 75 ppm, very preferably at least 100 ppm or at least 200 ppm, more particularly at least 250 ppm, of bismuth, based in each case on the total weight of the coating composition (A), in a form in which it is present in solution in the coating composition (A), as component (A3a). To the skilled person it is clear—because the coating composition (A) in the embodiment discussed here comprises at least 100 ppm of bismuth, based on the total weight of the coating composition (A), in a form (A3b) in which it is not present in solution in the coating composition (A)—that the coating composition (A) consequently comprises a total amount of at least 150 ppm or 175 ppm or 200 ppm or 300 ppm or 350 ppm, respectively, of bismuth, based in each case on the total weight of the coating composition (A). The amount of bismuth present in solution as component (A3a) is calculated in each case as bismuth metal. The fraction or the amount of bismuth (A3a) may be obtained in turn via the ICP-OES method (see Examples section).

The at least 100 ppm of bismuth present in undissolved form as component (A3b) in the coating composition (A) in the embodiment discussed here take the form preferably of a bismuth compound undissolved in the coating composition (A), more particularly the form of at least one undissolved bismuth salt, hydroxide and/or oxide.

The fraction of component (A3b) within the total amount of the bismuth present in the coating composition (A), in other words based on the total amount of the bismuth contained in the coating composition (A), in moles, is preferably at least 10 mol %, more preferably at least 20 mol % or at least 30 mol %, very preferably at least 40 mol % or at least 50 mol % or at least 60 mol % or at least 70 mol %. The fraction of component (A3b) within the total amount of bismuth contained in the coating composition (A) here is preferably in each case at most 98 mol %, more preferably at most 97 mol % or at most 96 mol %, very preferably at most 95 mol %.

The fraction of component (A3b) in mol % within the total amount of the bismuth in the coating composition (A) is preferably greater than the fraction of component (A3a) in mol %.

The term "in a form in which it is not present in solution" in connection with component (A3b) of the coating composition (A) of the invention is preferably understood such that at a coating composition (A) temperature of 20° C., component (A3b) is present in undissolved form in the coating composition (A). Before it is introduced into the coating composition (A), therefore, component (A3b) is preferably part of a compound which is at least not of unlimited water-solubility, more particularly of a bismuth salt which is at least not of unlimited water-solubility.

Component (A3b) preferably takes the form of a bismuth compound selected from the group consisting of oxides, basic oxides, hydroxides, carbonates, basic nitrates (subnitrates), salicylates and basic salicylates (subsalicylates) of bismuth, and also mixtures thereof, more preferably in the form of bismuth subnitrate.

The coating composition (A) comprises preferably at least 150 ppm, more preferably at least 200 ppm, very preferably at least 250 ppm or at least 300 ppm, more particularly at least 500 ppm, of bismuth, based in each case on the total weight of the coating composition (A), in a form in which it is not present in solution in the coating composition (A), as component (A3b). To the skilled person it is clear—because the coating composition (A) in this embodiment comprises at least 30 ppm of bismuth, based on the total weight of the coating composition (A), in a form (A3a) in which it is present in solution in the coating composition (A)—that the coating composition (A) consequently comprises a total amount of at least 180 ppm or at least 230 ppm or at least 280 ppm or at least 330 ppm or at least 530 ppm, respectively, of bismuth, based in each case on the total weight of the coating composition (A). The amount of bismuth present not in solution as component (A3b) is calculated in each case as bismuth metal. The fraction of component (A3b) in the coating composition (A) can in turn be computed using the ICP-OES method (see Examples section).

It follows from the above that the components (A3a) and (A3b), optionally with use of a component (A3aa), may also be introduced from one and the same bismuth compound. By adapting the proportions of component (A3aa) and the bismuth compound and/or by suitably choosing a particular amount of a bismuth compound having a defined, limited water-solubility, it is then possible to obtain the target amounts of (A3a) and (A3b). Also of advantage in this context is that the bismuth compound and optionally the component (A3aa) can also be added to the coating composition directly and without separate mixing step, and in this way the components (A3a) and (A3b) can be introduced very efficiently into the composition. This procedure, i.e., the direct addition of such a bismuth compound, meaning in particular a not fully water-soluble bismuth compound or a bismuth compound only sparingly soluble in water, and also of component (A3aa), to the coating composition is therefore preferred.

Preferably the coating composition (A) comprises a total amount of at least 300 ppm of bismuth, based on the total weight of the coating composition (A), including
(A3a) at least 100 ppm of bismuth, based on the total weight of the coating composition (A), in a form in which it is in solution in the coating composition (A), and
(A3b) at least 200 ppm of bismuth, based on the total weight of the coating composition (A), in a form in which it is not in solution in the coating composition (A).

More preferably the coating composition (A) comprises a total amount of at least 400 ppm of bismuth, based on the total weight of the coating composition (A), including
(A3a) at least 150 ppm of bismuth, based on the total weight of the coating composition (A), in a form in which it is in solution in the coating composition (A), and
(A3b) at least 250 ppm of bismuth, based on the total weight of the coating composition (A), in a form in which it is not in solution in the coating composition (A).

Very preferably the coating composition (A) comprises a total amount of at least 500 ppm of bismuth, based on the total weight of the coating composition (A), including
(A3a) at least 200 ppm of bismuth, based on the total weight of the coating composition (A), in a form in which it is in solution in the coating composition (A), and
(A3b) at least 300 ppm of bismuth, based on the total weight of the coating composition (A), in a form in which it is not in solution in the coating composition (A).

Component (A3aa)

The coating composition (A) of the invention preferably comprises at least one at least bidentate complexing agent suitable for complexing bismuth, as component (A3aa), and the at least one complexing agent (A3aa) is present in the aqueous coating composition (A) preferably in a fraction of at least 5 mol %, based on the total amount of the bismuth present in the coating composition (A). As already described above, an inherently undissolved bismuth compound (comprising component (A3b)) may be converted partly into the component (A3a) through the presence of the component (A3aa) in the coating composition (A).

Complexing agents especially suitable as component (A3aa) are those which are capable of converting bismuth compounds not in solution in water, preferably at temperatures in the range from 10 to 90° C. or in the range from 20 to 80° C., more preferably in the range from 30 to 75° C., into a water-soluble form (A3a).

Whether a certain component or chemical compound is suitable for use in accordance with the invention as at least bidentate complexing agent (A3aa) can be verified by the skilled person through the following determination method: the total amount of components (A3a) and (A3b) or their fractions, contained in a coating composition which, however, comprises no complexing agent, is ascertained. Added to this composition is the chemical compound whose suitability for complexing is under investigation, in an amount such that the molar ratio of this compound to the component (A3b) in the composition is exactly one. The resulting mixture is stirred at 18 to 23° C. for a duration of 24 hours and then the amount of component (A3a) present in the composition is ascertained. If the amount of component (A3a) has increased by at least 50%, preferably by at least 100%, based on the amount of (A3a) determined before the addition of the component or compound, then the component or compound is suitable as complexing agent (A3aa).

In the aqueous coating composition (A), the at least one complexing agent (A3aa) is present preferably in a fraction of at least 7.5 mol % or at least 10 mol %, more preferably in a fraction of at least 15 mol % or at least 20 mol %, very preferably in a fraction of at least 30 mol % or at least 40 mol %, more particularly in a fraction of at least 50 mol %, based in each case on the total amount of the bismuth in the coating composition (A). The respective amount of the inventively employed complexing agent (A3aa) here is dependent, for example, on the denticity of (A3aa) and/or the complexing strength of (A3aa) and/or the desired fractional amount of components (A3a) and/or (A3b). The at least one complexing agent (A3aa) is present in the aqueous coating composition (A), however, only in a fraction such as to ensure that there is at least 100 ppm of bismuth, based on the total weight of the coating composition (A), in a form in which it is not present in solution in the coating composition (A).

The complexing agent (A3aa) is preferably not a binder component (A1) and in particular is also not used for preparing the binder (A1).

The complexing agent (A3aa) is at least bidentate. A skilled person knows of the term "denticity". The term refers to the number of possible bonds which can be formed by a molecule of the complexing agent (A3aa) to the atom that is to be complexed, such as to the bismuth atom and/or bismuth ion that is to be complexed. Preferably (A3aa) is bidentate, tridentate or tetradentate, more particularly bidentate.

The complexing agent (A3aa) may be an anion—the anion, for example, of an organic monocarboxylic or polycarboxylic acid.

The complexing agent (A3aa) has preferably at least two donor atoms, in other words at least two atoms having at least one free electron pair in the valence shell. Preferred donor atoms are selected from the group consisting of N, S, and O atoms, and mixtures thereof. Particularly preferred complexing agents (A3aa) are those having at least one oxygen donor atom and at least one nitrogen donor atom, or those having at least two oxygen donor atoms. Especially preferred complexing agents (A3aa) are those having at least two oxygen donor atoms.

Where O and/or S donor atoms are present in the complexing agent (A3aa), it is preferred for each of these at least two donor atoms to be bonded to a different carrier atom such as a carbon atom which itself is not a donor atom. If there are at least two N donor atoms in the complexing agent (A3aa), then each of these at least two N donor atoms may be bonded to the same carrier atom which itself is not a donor atom, as in the case of guanidine or urea, for example.

Where O and/or S donor atoms are present in the complexing agent (A3aa), such as at least two O donor atoms, for example, and where each of these at least two donor atoms is bonded to a different carrier atom such as to a carbon atom which is itself not a donor atom, then these at least two carrier atoms may be bonded to one another directly, in other words may be adjacent, as is the case, for example, in oxalic acid, lactic acid, bicine (N,N'-bis(2-hydroxyethyl)glycine), EDTA or α-amino acids. Two donor atoms, the two carrier atoms bonded to one another, and the atom and/or ion to be complexed may then form a five-membered ring. Alternatively, the two carrier atoms may also be bridged to one another via a single further atom, as is the case, for example, with acetylacetonate or, with regard to phosphorus atoms as carrier atoms, for 1-hydroxyethane-1,1-diphosphonic acid. Two donor atoms, the two carrier atoms, the atom bridging these carrier atoms, and the atom and/or ion to be complexed may then form a six-membered ring. The at least two carrier atoms may, furthermore, be joined to one another by two further atoms, as in the case of maleic acid, for example. If there is a double bond between the two atoms joining the carrier atoms to one another, then the two carrier atoms must be in the cis-position relative to one another, in order to allow the formation of a seven-membered ring with the atom and/or ion to be complexed. Where two carrier atoms are part of an aromatic system, or where these carrier atoms are joined to one another by up to two further carrier atoms, preference is given to locations in the 1,2 and 1,3 positions in the aromatic system, such as, for example, in the case of gallic acid, of the tirone, of salicylic acid or of phthalic acid. Furthermore, the donor atoms may also themselves be part of an aliphatic or aromatic ring system, as in the case of 8-hydroxyquinoline, for example.

Especially preferred complexing agents (A3aa) are those having at least two oxygen donor atoms. In this case at least one of the oxygen donor atoms may have a negative charge, as in the case of acetylacetonate, for example, or may be part of an acid group, such as a carboxylic acid group, phosphonic acid group or sulfonic acid group, for example. Optionally it is also or alternatively possible for the oxygen atom of the acid group to carry a negative charge, as in the deprotonation and formation of a carboxylate group, phosphonate or sulfonate group. The wording "complexing agent (A3aa) having at least two oxygen donor atoms" of course does not rule out the presence also of other donor atoms such as nitrogen, for example.

If at least one donor atom is an N atom, then a further donor atom is preferably an O atom which carries a negative charge or is part of an acid group (carboxylic acid, phosphonic acid, sulfonic acid, etc.).

Where (A3aa) has only N atoms as donor atoms, then this component may also be an anion, as in the case of 1,2- or 1,3-dioxime anions, for example. Preferred carrier atoms in this case are C atoms. N atoms as donor atoms are preferably in the form of primary, secondary or tertiary amino groups or of oxime groups.

Where (A3aa) has only S atoms and/or O atoms as donor atoms, then preferred carrier atoms in this case are C atoms, S atoms and P atoms, especially C atoms. O atoms as donor atoms are preferably present at least fractionally in anionic form (e.g., acetylacetonate) or in the form of carboxylate groups, phosphonate groups or sulfonate groups. S atoms as donor atoms are preferably in the form of thiols, such as in cysteine, for example.

Preferably the complexing agent (A3aa) is selected from the group consisting of nitrogen-free, preferably at least singly hydroxyl-substituted organic monocarboxylic acids, nitrogen-free, optionally at least singly hydroxyl-substituted organic polycarboxylic acids, optionally at least singly hydroxyl-substituted aminopolycarboxylic acids, optionally at least singly hydroxyl-substituted aminomonocarboxylic acids, and sulfonic acids, and also, in each case, their anions, and, moreover, of preferably optionally at least singly hydroxyl-substituted monoamines and optionally at least singly hydroxyl-substituted polyamines, and of chemical compounds which comprise at least two O donor atoms and do not fall within the compounds identified within this recitation, such as, for example, 8-hydroxyquinoline and acetylacetone.

Suitability as complexing agent (A3aa) is possessed, for example, by at least one organic monocarboxylic acid or polycarboxylic acid which preferably has no nitrogen atom(s), and/or by anions thereof.

The term "polycarboxylic acid" in the sense of the present invention refers preferably to a carboxylic acid which has two or more carboxyl groups, as for example 2, 3, 4, 5 or 6 carboxyl groups. More preferably, the polycarboxylic acid has 2 or 3 carboxyl groups. Polycarboxylic acids having two carboxyl groups are dicarboxylic acids, and polycarboxylic acids having three carboxyl groups are tricarboxylic acids. The inventively employed polycarboxylic acids may be aromatic, semiaromatic, cycloaliphatic, semicycloaliphatic or aliphatic, preferably aliphatic. The inventively employed polycarboxylic acids have preferably 2 to 64 carbon atoms, more preferably 2 to 36, more particularly 3 to 18 or 3 to 8 carbon atoms. Examples of polycarboxylic acids are oxalic acid, malonic acid, succinic acid, glutaric acid, adipic acid, tartaric acid, citric acid, mucic acid, and malic acid.

The term "monocarboxylic acid" refers in the sense of the present invention preferably to a preferably aliphatic monocarboxylic acid which has exactly one —C(=O)—OH group. The inventively employed monocarboxylic acids have preferably 1 to 64 carbon atoms, more preferably 1 to 36, more particularly 2 to 18 or 3 to 8 carbon atoms. The monocarboxylic acid here has preferably at least one hydroxyl group.

If the complexing agent (A3aa) used is at least one organic monocarboxylic or polycarboxylic acid having preferably no nitrogen atom(s), and/or anions thereof, then the at least one organic monocarboxylic or polycarboxylic acid and/or anions thereof preferably has at least one carboxyl group or carboxylate group which is bonded to an organic radical having 1-8 carbon atoms, it being possible for the organic radical optionally to be substituted by at least one, preferably at least one or at least two, substituent(s) selected from the group consisting of hydroxyl groups, ester groups, and ether groups. The organic monocarboxylic or polycarboxylic acid is preferably selected from the group consisting of monocarboxylic and polycarboxylic acids and/or anions thereof which in α-, β- or γ-position to the at least one carboxyl and/or carboxylate group have one or two alcoholic hydroxyl group(s) or ester group(s) or ether group(s). Examples of such acids are as follows: glycolic acid (hydroxyacetic acid), lactic acid, γ-hydroxypropionoic acid, α-methylolpropionic acid, α,α'-dimethylolpropionic acid, tartaric acid, hydroxyphenylacetic acid, malic acid, citric acid, and sugar acids such as gluconic acid and mucic acid, for example. Cyclic or aromatic carboxylic acids are likewise suitable if the hydroxyl, ester or ether groups are arranged with respect to the carboxyl group in such a way as to enable formation of complexes. Examples thereof are salicylic acid, gallic acid, hydroxybenzoic acid, and 2,4-dihydroxybenzoic acid. Examples of suitable carboxylic acids having an ether group or ester group are methoxyacetic acid, methyl methoxyacetate, isopropyl methoxyacetate, dimethoxyacetic acid, ethoxyacetic acid, propoxyacetic acid, butoxyacetic acid, 2-ethoxy-2-methylpropanoic acid, 3-ethoxypropanoic acid, butoxypropanoic acid and esters thereof, butoxybutyric acid, and α- or β-methoxypropionic acid. Optically active carboxylic acids such as lactic acid can be used in the L-form, in the D-form or as the racemate. Preference is given to using lactic acid (in optically active form, preferably as the L-form, or as the racemate) and/or dimethylolpropionic acid.

It is, however, also possible to use organic monocarboxylic or polycarboxylic acids and/or anions thereof as complexing agents (A3aa) which have nitrogen atoms, especially aminomonocarboxylic acids and/or aminopolycarboxylic acids, and/or anions thereof.

The term "aminopolycarboxylic acid" refers in the sense of the present invention preferably to a carboxylic acid which has two or more carboxyl groups, as for example 2, 3, 4, 5 or 6 carboxyl groups, and also at least one amino group, as for example at least one primary and/or secondary and/or tertiary amino group, more particularly at least one or at least two tertiary amino groups. The inventively employed aminopolycarboxylic acids preferably have 2 to 64 carbon atoms, more preferably 2 to 36, more particularly 3 to 18 or 3 to 8 carbon atoms. Examples of aminopolycarboxylic acids are ethylenediaminetetraacetic acid (EDTA), diethylenetriaminepentaacetic acid (DTPA), nitrilotriacetic acid (NTA), aspartic acid, methylglycinediacetic acid (MGDA), β-alaninediacetic acid (β-ADA), imidosuccinate (IDS), hydroxyethyleneiminodiacetate (HEIDA), and N-(2-hydroxyethyl)ethylene-diamine-N,N,N'-triacetic acid (HEDTA).

The term "aminomonocarboxylic acid" refers in the sense of the present invention preferably to a carboxylic acid which has exactly one carboxyl group and also has at least one amino group, as for example at least one primary and/or secondary and/or tertiary amino group, more particularly at least one or at least two tertiary amino groups. The inventively employed aminomonocarboxylic acids preferably have 2 to 64 carbon atoms, more preferably 2 to 36, more particularly 3 to 18 or 3 to 8 carbon atoms. The aminomonocarboxylic acid here has preferably at least one hydroxyl group, more preferably two hydroxyl groups. An example of an aminomonocarboxylic acid which is particularly preferred in the context of the present invention is bicine (N,N'-bis(2-hydroxyethyl)glycine). Other examples are glycine, alanine, lysine, cysteine, serine, threonine, asparagine, β-alanine, 6-aminocaproic acid, leucine and dihydroxyethylglycine (DHEG), and also pantothenic acid.

Also suitable as complexing agent (A3aa), for example, is at least one polyamine or monoamine.

The term "polyamine" refers in the sense of the present invention preferably to a compound which has at least two amino groups such as primary or secondary or tertiary amino groups. The amino groups may also be present in the form of oxime groups. Overall, however, it is possible for a polyamine to have preferably up to and including 10 amino groups—that is, in addition to the at least two amino groups, up to and including 8 further, that is 1, 2, 3, 4, 5, 6, 7 or 8, preferably up to and including 5 further, amino groups, which are preferably primary or secondary or tertiary amino groups. The polyamine is preferably a diamine or triamine, more preferably a diamine. The inventively employed polyamines have preferably 2 to 64 carbon atoms, more preferably 2 to 36, more particularly 3 to 18 or 3 to 8 carbon atoms. At least one of the carbon atoms is preferably substituted by a hydroxyl group. Hydroxyalkylpolyamines are therefore particularly preferred. Examples of polyamines are N,N,N',N'-tetrakis-2-hydroxyethylethylenediamine (THEED), N,N,N',N'-tetrakis-2-hydroxypropylethylenediamine (Quadrol), guanidine, diethylenetriamine, and diphenyl carbazide, and also diacetyl dioxime.

The term "monoamine" refers in the sense of the present invention preferably to a preferably aliphatic monoamine which has exactly one amino group, such as, for example, exactly one primary or secondary or, in particular, tertiary amino group. The inventively employed monoamines have preferably 1 to 64 carbon atoms, more preferably 1 to 36, more particularly 2 to 18 or 3 to 8 carbon atoms. The monoamine here preferably has at least one hydroxyl group. An example of such a monoamine is triisopropanolamine.

Also suitable as complexing agent (A3aa) is, for example, at least one sulfonic acid. Examples of suitable sulfonic acids are taurine, 1,1,1-trifluoromethanesulfonic acid, tirone, and amidosulfonic acid.

In one preferred embodiment at least one at least bidentate complexing agent suitable for complexing bismuth, as component (A3aa), is a compound of the general formula (1) or an anion of said compound

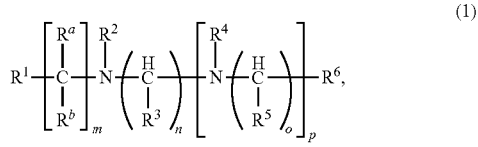

(1)

in which
R$^1$ is a C$_{1-6}$ aliphatic radical substituted by at least one OH group,
m is 0 or 1,
R$^a$ and R$^b$ in each case independently of one another are selected from the group consisting of H and C$_{1-6}$ aliphatic radicals, optionally substituted by at least one OH group,
R$^2$, R$^3$, R$^4$, and R$^5$ in each case independently of one another are H or are a C$_{1-6}$ aliphatic radical optionally substituted by at least one OH group,
n is 1 or 2,
o is 1 or 2,
p is 0, 1, 2, or 3, and
R$^6$ is C(=O)OH, S(=O)$_2$OH, P(=O)(OH)$_2$, NR$^7$R$^8$, or a C$_{1-6}$ aliphatic radical which is substituted by at least one OH group,
where R$^7$ and R$^8$ in each case independently of one another are selected from the group consisting of H and C$_{1-6}$ aliphatic radicals which are optionally substituted by at least one OH group,
with the proviso that at least one of the radicals R$^7$ and R$^8$ is a C$_{1-6}$ aliphatic radical which is substituted by at least one OH group.

The expression "C$_{1-6}$ aliphatic radical" in the sense of this invention encompasses preferably acyclic saturated or unsaturated, preferably saturated, aliphatic hydrocarbon radicals, i.e., C$_{1-6}$ aliphatic radicals which may each be branched or unbranched and also unsubstituted or, optionally, substituted at least singly, as for example doubly or triply, but preferably singly, by at least one, optionally also two or three, OH group(s), and having 1 to 6, i.e., 1, 2, 3, 4, 5, or 6, carbon atoms, i.e., C$_{1-6}$ alkanyls, C$_{2-6}$ alkenyls, and C$_{2-6}$ alkynyls. Alkenyls here have at least one C—C double bond, and alkynyls here have at least one C—C triple bond. More preferably a C$_{1-6}$ aliphatic radical is a C$_{1-6}$ alkanyl. Preferably a C$_{1-6}$ aliphatic radical is selected from the group encompassing methyl, ethyl, n-propyl, 2-propyl, n-butyl, isobutyl, sec-butyl, tert-butyl, n-pentyl, isopentyl, neopentyl, and n-hexyl. Particularly preferred is a C$_{1-6}$ aliphatic radical selected from the group encompassing ethyl, n-propyl, 2-propyl, n-butyl, isobutyl, and sec-butyl, more particularly ethyl, n-propyl, and 2-propyl. A C$_{1-4}$ aliphatic radical corresponds in the sense of the present invention to a C$_{1-6}$ aliphatic radical and to the preferred embodiments specified above for such a radical, with the difference that a C$_{1-4}$ aliphatic radical of this kind has only 1 to 4 carbon atoms, i.e., 1, 2, 3, or 4 carbon atoms.

More preferably component (A3aa) is selected from the group consisting of ethylenediaminetetraacetic acid, lactic acid, N,N,N',N'-tetrakis-2-hydroxypropylethylenediamine, N,N'-bis(2-hydroxyethyl)glycine, and N,N,N',N'-tetrakis-2-hydroxyethylethylenediamine, very preferably N,N'-bis(2-hydroxyethyl)glycine (bicine).

If ethylenediaminetetraacetic acid and/or anions thereof is used as complexing agent (A3aa), it is present in the aqueous coating composition (A) preferably in a fraction in a range of <100 mol %, more preferably in a range from 20 to 60 mol %, based in each case on the total amount of bismuth present in the coating composition (A). If N,N'-bis(2-hydroxyethyl)glycine is used as complexing agent (A3aa), it is present in the aqueous coating composition (A) preferably in a fraction in a range of <900 mol %, more preferably in a range from 100 to 700 mol %, based in each case on the total amount of bismuth present in the coating composition (A). If N,N,N',N'-tetrakis-2-hydroxyethylethylenediamine is used as complexing agent (A3aa), it is present in the aqueous coating composition (A) preferably in a fraction in a range from 100 to 600 mol %, based in each case on the total amount of bismuth present in the coating composition (A). If N,N,N',N'-tetrakis-2-hydroxypropylethylenediamine is used as complexing agent (A3aa), it is present in the aqueous coating composition (A) preferably in a fraction in a range from 50 to 300 mol %, based in each case on the total amount of bismuth present in the coating composition (A).

The molar fraction of any at least one amino-polycarboxylic acid present in the aqueous coating composition (A), more particularly of aminopolycarboxylic acid used as component (A3aa), is preferably lower by a factor of at least 15 or 20, more preferably by a factor of at least 30 or 40 or 50 or 60 or 70 or 80 or 90 or 100 or 1000, than the total amount of bismuth present in the aqueous coating composition (A), in moles, preferably based in each case on the total weight of the aqueous composition (A). The presence of such acids may possibly lead to problems with dipping bath stability and with wastewater treatment, as a result of accumulation of these compounds within the dipping bath.

Component (A4)

The coating composition (A) of the invention comprises, in a form in which it is present in solution in (A) (also called "in dissolved form"), lithium (A4) in a fraction of not more than 300 ppm, based on the total weight of the coating composition (A).

It has emerged that a certain fraction of lithium is essential to the fulfillment of an improved corrosion prevention. Equally, however, it has emerged that exceeding the limiting value specified above has, in turn, significantly adverse consequences for the coating being produced. An exceedance, indeed, means that a poorly conditioned coating is obtained (holes, specks, poor adhesion) or even that deposition becomes completely impossible.

The conditions and features governing the lithium present in "a form in which it is present in solution" and the amounts thereof (calculated as metal) correspond here in principle to the circumstances described above for bismuth. Here as well, moreover, in analogy to the bismuth, the term "lithium" refers preferably to cationic lithium atoms. The lithium in this case is present as Li(I), in other words with the +1 valence.

Accordingly, the term "form in which it is present in solution" in connection with component (A4) of the coating composition (A) of the invention is preferably understood such that component (A4) at a coating composition (A) temperature of 20° C. is present in dissolved form in the coating composition (A). Before it is introduced into the coating composition (A), therefore, component (A4) is preferably part of a compound of at least limited water-solubility, more particularly of a lithium salt of at least limited water-solubility. This is self-evident to the skilled person from the fact that the coating composition of the invention is aqueous. By introducing a lithium salt of at least limited water-solubility into the coating composition (A), at least a part of the lithium salt is then dissolved, and so the composition then comprises the component (A4).

The component (A4) is preferably obtainable from at least one lithium salt, more preferably a lithium salt selected from the group consisting of lithium acetate, lithium carbonate, lithium nitrate, lithium hydroxide, lithium phosphate, lithium formate, lithium salicylate, lithium sulfate, lithium molybdate, lithium tetraborate.

The coating composition (A) comprises preferably not more than 250 ppm, more preferably not more than 200 ppm, very preferably not more than 150 ppm or not more than 100 ppm, more particularly not more than 70 ppm or 50 ppm or not more than 40 ppm or not more than 30 ppm, of lithium in a form dissolved in (A), based in each case on the total weight of the coating composition (A). Preferred ranges among these are 2.5 to 250 ppm, 5 to 200 ppm, 7.5 to 150 ppm, 10 to 100 ppm, 12.5 to 70 ppm, 12.5 to 50 ppm or 12.5 to 40 ppm, or 12.5 to 30 ppm, based in each case on the total weight of the coating composition (A).

The fraction or the amount of lithium (A4) may be obtained in turn via the ICP-OES method (see Examples section).

Of course, the coating composition may also comprise lithium in a form not dissolved in (A) (that is, in a form in which it is present not in solution). This is the case, for example, when using lithium salts which in the range of the fractional amounts employed are not fully dissolved and are therefore present partly in undissolved form in (A).

The term "form in which it is not present in solution" in connection with lithium, which may be contained in the coating composition (A) of the invention, is again subject relatively to the principles described above for Bi. Accordingly, it means preferably that this lithium is in a form in which it is not present in solution, for a coating composition (A) temperature of 20° C.

The fraction of lithium present in undissolved form in the coating composition (A) can in turn be computed using the ICP-OES method (see Examples section).

Optional Component (A6)

In one preferred embodiment of the present invention, the coating composition (A) further comprises copper, especially preferably at any rate, but not exclusively necessarily, copper in a form (A6a) dissolved in (A).

It has emerged that by this means it is possible to achieve a further improvement in the corrosion inhibition properties, particularly in respect of substrates which are not only aluminum—but also steel-based (that is, have different regions in terms of their metal type). Indeed, the fact that such coating compositions are able to offer outstanding corrosion protection in relation to both types of metal is particularly advantageous in view of the increasing importance of such substrates (lightweight construction).

The conditions and features in relation to the copper present in "a form in which it is present in solution" or "in undissolved form" and the amounts thereof (calculated as metal) here correspond in principle to the circumstances described above for bismuth and lithium. At this point too, moreover, in analogy to bismuth and lithium, the term "copper" refers preferably to cationic copper atoms. The copper here is present preferably as Cu(II), in other words with the +2 valence.

Where copper is included, it is preferred for the fraction of copper (A6a) which is present in a form dissolved in (A) to be not lower than 5 ppm, preferably not lower than 10 ppm, especially preferably not lower than 15 ppm or else 20 ppm (based in each case on the total amount of the coating composition (A)). Further preferred are amounts of copper, present in dissolved form, of 5 to 1000 ppm, preferably 10 to 750 ppm, more preferably 15 to 500 ppm or else 20 to 250 ppm.

The component (A6a) is preferably obtainable from at least one copper salt, more preferably a copper salt selected from the group consisting of copper nitrate, copper sulfate, and copper acetate.

The fraction or the amount of copper (A6a) may in turn be obtained via the ICP-OES method (see Examples section).

As already indicated above, the coating composition may also further comprise copper in a form not dissolved in (A). This is the case, for example, when using copper salts which, in the range of the fractional amounts employed, are not completely dissolved and therefore are present partly in undissolved form in (A). This fraction as well may in turn be determined via the ICP-OES method.

Component (A5)

As set out later on below in more detail, the coating composition (A) of the invention preferably comprises a bismuth-based crosslinking catalyst. For this case in particular, it is preferred in the context of the present invention for the fraction of phosphorus (A5) present in (A) of the coating composition not to exceed an amount of 100 ppm, based on the total weight of the coating composition (A).

It has emerged that exceeding the limiting value specified above, at standard crosslinking temperatures, leads to a markedly reduced crosslinking capacity on the part of the binder and crosslinker components present, and hence to a reduced crosslinking density in the coating film for cathodic deposition. Without wishing to be tied to any particular theory, it is assumed that the reaction of the phosphorus with bismuth removes the catalyst from the coating material and hence allows sufficient crosslinking to be produced only at very high temperatures. Accordingly it is preferred for the amount of phosphorus (calculated in turn as metal) not to exceed this value.

With preference the fraction of phosphorus present in dissolved form, based on the total weight of the coating composition, does not exceed an amount of 75 ppm or 60 ppm, more preferably 45 ppm or else 30 ppm, very preferably 20 ppm or 10 ppm.

Further Optional Components of the Coating Composition (A)

Depending on desired application, moreover, the aqueous coating composition (A) used in accordance with the invention may comprise at least one pigment (A7).

A pigment (A7) of this kind, present in the aqueous coating composition (A), is preferably selected from the group consisting of organic and inorganic, color-imparting and extending pigments (the latter being also called fillers).

Examples of suitable inorganic color-imparting pigments (A7) are white pigments such as zinc oxide, zinc sulfide, titanium dioxide, antimony oxide, or lithopone; black pigments such as carbon black, iron manganese black, or spinel black; chromatic pigments such as cobalt green or ultramarine green, cobalt blue, ultramarine blue or manganese blue, ultramarine violet or cobalt violet and manganese violet, red iron oxide, molybdate red, or ultramarine red; brown iron oxide, mixed brown, spinel phases and corundum phases; or yellow iron oxide, nickel titanium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders.

The pigment content of the aqueous coating compositions (A) may vary according to intended use and according to the nature of the pigments (A7). The amount, based in each case on the total weight of the aqueous coating composition (A), is preferably in the range from 0.1 to 30 wt % or in the range from 0.5 to 20 wt %, more preferably in the range from 1.0 to 15 wt %, very preferably in the range from 1.5 to 10 wt %, and more particularly in the range from 2.0 to 5.0 wt %, or in the range from 2.0 to 4.0 wt %, or in the range from 2.0 to 3.5 wt %.

Depending on desired application, the coating composition (A) may comprise one or more typically employed additives (A8). These additives (A8) are preferably selected from the group consisting of wetting agents, emulsifiers, which preferably do not contain component (A9), dispersants, surface-active compounds such as surfactants, flow control assistants, solubilizers, defoamers, rheological assistants, antioxidants, stabilizers, preferably heat stabilizers, in-process stabilizers, and UV and/or light stabilizers, catalysts, fillers, waxes, flexibilizers, plasticizers, and mixtures of the abovementioned additives. The additive content may vary very widely according to intended use. The amount, based on the total weight of the aqueous coating composition (A), is preferably 0.1 to 20.0 wt %, more preferably 0.1 to 15.0 wt %, very preferably 0.1 to 10.0 wt %, especially preferably 0.1 to 5.0 wt %, and more particularly 0.1 to 2.5 wt %.

In the context of the present invention it is preferred if the coating composition comprises a bismuth-based crosslinking catalyst (V). Crosslinking catalysts (V) in the context of the present invention are catalysts which catalyze the crosslinking of the binder (A1) with the crosslinking agent (A2), or thus, to put it more precisely, which catalyze the reaction of corresponding reactive functional groups of the binder (A1) with complementary reactive functional groups of the crosslinking agent (A2). A preferred combination of functional groups, accordingly, consists evidently of isocyanate-reactive groups of the binder (A1), more preferably hydroxyl groups, and isocyanate groups of the crosslinking agent (A2) (which come about preferably after unblocking of blocked isocyanate groups).

The bismuth-based crosslinking catalyst preferably comprises bismuth in the known oxidation states. As already indicated above, the coating composition already comprises bismuth in any case, at any rate preferably including bismuth in a form (A3a) dissolved in (A). Accordingly, this bismuth, possibly also after transfer of the components (A3b), with reaction with component (A3aa), into the component (A3a), may serve as crosslinking catalyst (V). It is equally possible for the existing bismuth (A3b) to have a catalytic effect.

It follows from this that in the context of the present invention there is preferably a bismuth-based catalyst which is included in component (A3), preferably at any rate, but not necessarily exclusively, in component (A3a). The technical advantage arising from this is that there may be no need to use a separate crosslinking catalyst, since said catalyst is already present anyway.

Method for Producing the Coating Composition (A)

Another subject of the present invention is a method for producing a coating composition (A).

In principle the production may be carried out according to the production methods commonplace and known in particular for cathodic electrocoat materials, comprising the mixing and dispersing of the included components in a sequence typical for this purpose.

The method preferably comprises
the partial conversion of at least one water-insoluble bismuth compound into at least one water-soluble bismuth compound in water, by partial reaction of the water-insoluble bismuth compound with at least one at least bidentate complexing agent (A3aa) suitable for complexing bismuth, optionally in the presence of at least one further component of the coating composition of the invention, to give a mixture comprising at least components (A3a), (A3b), and (A3aa), and optional mixing of the resultant mixture with any components of the coating composition of the invention that are not yet present, to give the coating composition (A).

It is preferred, however, in the context of the method, for a water-insoluble bismuth compound and/or a bismuth compound not fully soluble in water to be mixed, preferably with further addition of a component (A3aa), with the other constituents of the coating composition, without the aforesaid bismuth compound and the component (A3aa) being contacted with one another in a separate mixing step.

The water-insoluble bismuth compound used is preferably part of a pigment paste which comprises at least one pigment (A7).

The coating composition (A) of the invention is preferably obtainable without the need for separate preparation of an aqueous solution of component (A3a). This saves on time and costs and on possible problems with the stability of the coating composition (A) that may occur when such an aqueous solution of component (A3a) is added, particularly if the coating composition is used in a dip-coating bath for at least partly coating electrically conductive substrates.

With further preference the method comprises at least step (0), namely
(0) partly converting at least one water-insoluble bismuth compound by partial reaction of this compound with at least one at least bidentate complexing agent (A3aa)

suitable for complexing bismuth, into at least one water-soluble bismuth compound (A3a) in water, in the presence of at least one of components (A7) to (A9) and optionally (A1) and/or (A2), to give a mixture comprising at least components (A3a), (A3b), and (A3aa) and also at least one of components (A7) to (A9) and/or, optionally, (A1) and/or (A2) of the coating composition (A).

After step (0) has been carried out, the method of the invention optionally comprises at least one further step, namely mixing the mixture obtained after step (0) has been carried out, optionally with component (A1) and optionally component (A2) and also, optionally, with at least one of components (A7) to (A9) and also, optionally, further components of the coating composition, to give the coating composition (A).

The duration of step (0) is preferably at least 2 or at least 4 or at least 6 or at least 8 or at least 10 or at least 12 or at least 14 or at least 16 or at least 18 or at least 20 or at least 22 or at least 24 hours. Step (0) is carried out preferably with stirring at a temperature in the range from 18 to 23° C.

All preferred embodiments described hereinabove in connection with the aqueous coating composition (A) of the invention are also preferred embodiments of the aqueous coating composition (A) used in accordance with the invention, in relation to its production.

It is further preferred if, in the production of the coating composition, the at least one pigment (A7) that is preferably present is used as a constituent of an aqueous solution or dispersion which comprises at least a fraction of component (A1) and optionally (A2).

The at least one additive (A9) here may be present as part of the aqueous solution or dispersion that is used for producing the coating composition (A), said solution or dispersion comprising components (A1) and optionally (A2) as well as the pigment (A7) preferably present.

Components (A4) and optionally (A6), especially (A6a), may be introduced as part of the production operation by means, for example, of the partial or complete dissolution of a lithium compound and/or copper compound, more particularly a salt, in water in the presence of at least one of the further components of the coating composition, more particularly of components (A7) to (A9) and optionally (A1) and/or (A2). It is equally possible for components (A4) and (A6), or (A6a), as water-soluble compound, to be merely dissolved in water and then introduced as an aqueous solution into the coating composition.

Method for at Least Partly Coating an Electrically Conductive Substrate with a Coating Material of the Invention The present invention also relates to a method for at least partially coating an electrically conductive substrate with a coating material of the invention, in other words, in particular, with an electrocoat material.

All preferred embodiments described hereinabove in connection with the aqueous coating composition (A) of the invention are also preferred embodiments of the aqueous coating composition (A) used in accordance with the invention, in relation to the method described here for at least partially coating an electrically conductive substrate.

Electrically Conductive Substrate

Suitable electrically conductive substrates used in accordance with the invention are all of the electrically conductive substrates known to the skilled person that are customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminumized steel, aluminum, and magnesium; particularly suitable are galvanized steel and aluminum. Suitable as substrates, moreover, are hot-rolled steel, high-strength steel, Zn/Mg alloys, and Zn/Ni alloys. Particularly suitable substrates are parts of bodies or complete bodies of automobiles for production. The method of the invention can also be used for coil coating. Before the electrically conductive substrate in question is used, the substrate is preferably cleaned and/or degreased.

The electrically conductive substrate used in accordance with the invention may be a substrate pretreated with at least one metal phosphate. The electrically conductive substrate used in accordance with the invention may, moreover, be a chromated substrate. Such pretreatment by phosphatizing or chromating, which normally takes place after the substrate has been cleaned and before it is dip-coated, is, in particular, a pretreatment step customary within the automobile industry. In this context it is especially desirable for a pretreatment, carried out optionally, to be designed advantageously from environmental and/or economic standpoints. Therefore, for example, an optional pretreatment step is possible in which instead of a customary trication phosphatizing, the nickel component is omitted and instead a dication phosphatizing (comprising zinc and manganese cations and no nickel cations) is carried out on the electrically conductive substrate used in accordance with the invention, prior to coating with the aqueous coating composition (A).

A specific advantage of the present invention, however, is that it is possible to forgo such pretreatment of the electrically conductive substrate for at least partial coating, by phosphatizing with a metal phosphate such as zinc phosphate, for example, or by means of chromating. In one preferred embodiment, therefore, the electrically conductive substrate used in accordance with the invention is not such a phosphatized or chromated substrate.

Prior to being coated with the aqueous coating composition (A) of the invention, the electrically conductive substrate used in accordance with the invention may be pretreated with an aqueous pretreatment composition which comprises at least one water-soluble compound comprising at least one Ti atom and/or at least one Zr atom and which comprises at least one water-soluble compound as a source of fluoride ions, comprising at least one fluorine atom, or with an aqueous pretreatment composition which comprises a water-soluble compound obtainable by reaction of at least one water-soluble compound comprising at least one Ti atom and/or at least one Zr atom with at least one water-soluble compound as a source of fluoride ions, comprising at least one fluorine atom.

The at least one Ti atom and/or the at least one Zr atom in this case preferably have the +4 oxidation state. By virtue of the components it contains and preferably by virtue, moreover, of the appropriately selected proportions of these components, the aqueous pretreatment composition preferably comprises a fluoro complex, such as a hexafluorometallate, i.e., in particular, hexafluorotitanate and/or at least one hexafluorozirconate. The pretreatment composition preferably has a total concentration of the elements Ti and/or Zr which is not below $2.5 \cdot 10^{-4}$ mol/L but is not greater than $2.0 \cdot 10^{-2}$ mol/L. The preparation of such pretreatment compositions and their use in the pretreatment of electrically conductive substrates are known from WO 2009/115504 A1, for example.

The pretreatment composition preferably further comprises copper ions, preferably copper(II) ions, and also, optionally, one or more water-soluble and/or water-dispersible compounds comprising at least one metal ion selected from the group consisting of Ca, Mg, Al, B, Zn, Mn and W, and also mixtures thereof, preferably at least one aluminosilicate, and more particularly one having an atomic ratio of Al to Si atoms of at least 1:3. The preparation of such pretreatment compositions and their use in the pretreatment of electrically conductive substrates are known from WO 2009/115504 A1, for example. The aluminosilicates are present preferably in the form of nanoparticles having a particle size in the range from 1 to 100 nm as determinable by dynamic light scattering. The average particle size for such nanoparticles, in the range from 1 to 100 nm, as determinable by dynamic light scattering, is determined in accordance with DIN ISO 13321 (date: Oct. 1, 2004).

In one preferred embodiment, however, the electrically conductive substrate used in accordance with the invention is a substrate which has not been pretreated with any such pretreatment composition.

It is an advantage of the coating material composition of the invention that not only is a generally good corrosion prevention effect achieved but also, moreover, it is possible to set and achieve an optimized adaptation of the effect to different substrates. In this sense it is of particular advantage that substrates which have regions differing in their metal type, in particular regions which both are aluminum-based and steel-based, can be coated with one and the same coating composition to produce in total, in other words in all substrate regions, an outstanding corrosion prevention effect. Preferred substrates, accordingly, are those which have regions differing in their metal type, in particular both aluminum-based and steel-based regions.

The method for at least partly coating an electrically conductive substrate with a coating composition of the invention, hence especially an electrocoat material, comprises at least one step (1):

(1) contacting the electrically conductive substrate, connected as cathode, with the aqueous coating composition (A) of the invention.

A further subject of the present invention is a method for at least partly coating an electrically conductive substrate with an electrocoat material, comprising at least one step (1):

(1) contacting the electrically conductive substrate, connected as cathode, with the aqueous coating composition (A) of the invention,
step (1) being carried out in at least two successive stages (1a) and (1b):
(1a) at an applied voltage in a range from 1 to 50 V, which is applied over a duration of at least 5 seconds, and
(1b) at an applied voltage in a range from 50 to 400 V, with the proviso that the voltage applied in stage (1b) is greater by at least 10 V than the voltage applied in stage (1a).

All preferred embodiments described hereinabove in connection with the aqueous coating composition (A) of the invention are also preferred embodiments of the aqueous coating composition (A) used in accordance with the invention, in relation to its use in step (1) of the method of the invention for at least partly coating an electrically conductive substrate.

Step (1)

The method of the invention for at least partly coating an electrically conductive substrate with, in particular, an electrocoat material comprises at least one step (1), this being a contacting of the electrically conductive substrate connected as cathode with the aqueous coating composition (A).

"Contacting" in the sense of the present invention refers preferably to the immersing of the substrate, intended for at least partial coating with the coating composition (A), into the aqueous coating composition (A) used, the spraying of the substrate intended for at least partial coating with the coating composition (A), or the roll application of the substrate intended for at least partial coating with the coating composition (A) to the substrate. More particularly, the term "contacting" in the sense of the present invention refers to immersing of the substrate intended for at least partial coating with the coating composition (A) into the aqueous coating composition (A) used.

The method of the invention is preferably a method for at least partly coating an electrically conductive substrate used in and/or for automobile construction. The method may take place continuously in the form of a strip coating operation, such as in the coil coating process, for example, or discontinuously.

With step (1) of the method of the invention, the substrate is at least partly coated with the aqueous coating composition (A) of the invention by cataphoretic deposition of this coating composition on the substrate surface.

Step (1) is accomplished by applying an electrical voltage between the substrate and at least one counterelectrode. Step (1) of the method of the invention is carried out preferably in a dip-coating bath. The counterelectrode may in this case be located in the dip-coating bath. Alternatively or additionally, the counterelectrode may also be present separately from the dip-coating bath, for example via an anion exchange membrane which is permeable to anions. In this case, anions formed during dip coating are transported from the coating material through the membrane into the anolyte, allowing the pH in the dip-coating bath to be regulated or kept constant. The counterelectrode is preferably separate from the dip-coating bath.

In step (1) of the method of the invention, preferably, there is full coating of the substrate with the aqueous coating composition (A) of the invention, by complete cataphoretic deposition on the entire substrate surface.

Preferably, in step (1) of the method of the invention, a substrate intended for at least partial coating is introduced at least partly, preferably completely, into a dip-coating bath, and step (1) is carried out within this dip-coating bath.

The aim in step (1) of the method of the invention is at least partial coating of the substrate by an at least partial cataphoretic deposition of the aqueous coating composition (A). The aqueous coating composition (A) of the invention in this case is deposited as electrocoat material on the substrate surface.

The aqueous coating composition (A) of the invention is preferably contacted with an electrically conducting anode and with the electrically conductive substrate connected as cathode. Alternatively, the aqueous coating composition (A) does not have to be brought directly into contact with an electrically conducting anode, if the anode, for example, is present separately from the dip-coating bath, as for example via an anion exchange membrane which is permeable to anions.

The passage of electrical current between anode and cathode is accompanied by deposition of a firmly adhering paint film on the cathode, i.e., on the substrate.

Step (1) of the method of the invention is carried out preferably at a dip bath temperature in a range from 20 to 45° C., more preferably in a range from 22 to 42° C., very preferably in a range from 24 to 41° C., especially preferably in a range from 26 to 40° C., with more particular preference in a range from 27 to 39° C., such as in a range from 28 to 38° C., for example. In another preferred embodiment of the method of the invention, step (1) is carried out at a dip bath temperature of not more than 40° C., more preferably not more than 38° C., very preferably not more than 35° C., especially preferably not more than 34° C. or not more than 33° C. or not more than 32° C. or not more than 31° C. or not more than 30° C. or not more than 29° C. or not more than 28° C.

In step (1) of the method of the invention, the aqueous coating composition (A) of the invention is preferably applied such that the resulting electrocoat film has a dry film thickness in the range from 5 to 40 µm, more preferably from 10 to 30 µm, especially preferably from 20 to 25 µm.

Stages (1a) and (1b) within Step (1)

Step (1) of the method of the invention is carried out in at least two successive stages (1a) and (1b) as follows:
(1a) at an applied voltage in a range from 1 to 50 V, which is applied over a duration of preferably at least 5 seconds,
and
(1b) at an applied voltage in a range from 50 to 400 V, with the proviso that the voltage applied in stage (1 b) is greater by at least 10 V than the voltage applied in stage (1a).

Stages (1a) and (1b) within step (1) of the method of the invention are carried out preferably within a dip-coating bath that is used, comprising the coating composition (A).

Stage (1a)

During the implementation of stage (1a), a corresponding layer enriched in bismuth and also, preferably, in copper is formed and may be termed a preliminary deposition layer on the electrically conductive substrate, this being detectable and quantifiable by X-ray fluorescence analysis, for example. Without wishing to be tied to any particular theory, the assumption is that lithium too is part of this layer. Bismuth, lithium and preferably copper are here preferably in the form of metallic bismuth(0), lithium (0), and preferably copper (0), but alternatively or additionally may also be present in their correspondingly known oxidation states. This preliminary deposition layer is, in particular, largely free of components (A1) and (A2) and/or (A3aa) and/or (A7) present in the coating composition.

Stage (1a) is carried out preferably with an applied voltage in a range from 1 to 45 V or in a range from 1 to 40 V or in a range from 1 to 35 V or in a range from 1 to 30 V or in a range from 1 to 25 V or in a range from 1 to 20 V or in a range from 1 to 15 V or in a range from 1 to 10 V or in a range from 1 to 5 V. In another preferred embodiment, stage (1a) is carried out with an applied voltage in a range from 2 to 45 V or in a range from 2 to 40 V or in a range from 2 to 35 V or in a range from 2 to 30 V or in a range from 3 to 25 V or in a range from 3 to 20 V or in a range from 3 to 15 V or in a range from 3 to 10 V or in a range from 3 to 6 V.

The voltage applied in stage (1a) is applied over a duration of at least 5 seconds, preferably of at least 10 or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1a).

In one preferred embodiment, the voltage applied in stage (1a) is applied over a duration in a range from at least 5 to 500 seconds or from 5 to 500 seconds or from 10 to 500 seconds or from 10 to 300 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

A voltage in a range from 1 to 50 V which is applied during the implementation of stage (1a) over a duration of at least 10 seconds may be set galvanostatically (constantly regulated current). Alternatively, this setting may also be accomplished potentiostatically (constantly regulated voltage), however, with stage (1a) being carried out at a deposition current or in a deposition current range that corresponds to a corresponding voltage in a range from 1 to 50 V. A deposition current of this kind is preferably in a range from 20 to 400 mA, more preferably in a range from 30 to 300 mA or in a range from 40 to 250 mA or in a range from 50 to 220 mA, more particularly in a range from 55 to 200 mA. Such deposition currents within stage (1a) are used preferably when employing substrates which have a surface area in the range from 300 to 500 $cm^2$, more particularly from 350 to 450 $cm^2$ or 395 to 405 $cm^2$.

The deposition current density in stage (1a) is preferably at least 1 $A/m^2$, more preferably at least 2 $A/m^2$, and more particularly at least 3 $A/m^2$, but preferably in each case not more than 20 $A/m^2$, more preferably in each case not more than 10 $A/m^2$.

The deposition current density or the deposition current in stage (1a) here is applied preferably over a duration of at least 5 or at least 10 seconds, preferably at least 15 or at least 20 or at least 25 or at least 30 or at least 40 or at least 50 seconds, more preferably at least 60 or at least 70 or at least 80 or at least 90 or at least 100 seconds, very preferably at least 110 or at least 120 seconds. The duration here is preferably not more than 300 seconds, more preferably not more than 250 seconds, and more particularly not more than 150 seconds. In another preferred embodiment, the deposition current density or deposition current applied in stage (1a) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage or the deposition current or the deposition current density may be kept constant here during the stated duration. Alternatively, however, the voltage or the deposition current or the deposition current density may also adopt different values during the deposition duration within stage (1a), within the stated minimum and maximum values in the range from 1 to 50 V—for example, it may swing back and forth or rise in ramp or step form from the minimum to the maximum deposition voltage.

The setting of the voltage or of the deposition current or deposition current density during the implementation of stage (1a) may take place "suddenly", in other words, for example, by appropriately switching over to a rectifier, this requiring a certain technically related minimum period of time in order to attain the target voltage. Alternatively, setting may take place in the form of a ramp, in other words at least approximately continuously and preferably linearly over a selectable period, as for example a period of up to 10, 20, 30, 40, 50, 60, 120, or 300 seconds. Preferred is a ramp of up to 120 seconds, more preferably of up to 60 seconds. A steplike voltage increase is also possible here, in which case preferably a certain hold time at the voltage is observed for each of these voltage stages, of 1, 5, 10, or 20 seconds, for example. Also possible is a combination of ramps and steps.

The setting of the voltage or of the deposition current or deposition current density in stage (1a) may also be regulated in the form of pulses, with times without current or with a voltage below the minimum level between two pulses. The pulse duration may be situated, for example, in the range from 0.1 to 10 seconds. The "period" for the deposition is then considered, preferably, to be the sum total of the durations for which the deposition voltage lies within the aforementioned maximum and minimum values when implementing step (1a). Ramps and pulses may also be combined with one another.

During the implementation of stage (1a), the complexing agent (A3aa) is preferably liberated again at least partly, more particularly completely, since the component (A3a) complexed by (A3aa) is deposited. In view of the preferred presence of component (A3b) in the coating composition (A), the liberated complexing agent (A3aa) may be utilized in order to convert component (A3b) at least partly into a form in solution in (A)—that is (A3aa) may be used for the continual generation of (A3a), in order to ensure the presence of an appropriate reservoir of (A3a).

Stage (1 b)

During the implementation of stage (1b), the actual dip varnish coating is formed on the preliminary deposition layer obtained after step (1a), by deposition of the dip varnish components, more particularly (A1) and (A2) and preferably (A7). This coating as well comprises bismuth, for example, which may be present in the known oxidation states. This bismuth may act as catalyst in a downstream curing step or crosslinking step (6) of the method of the invention. In the production of the coating composition (A), accordingly, it is possible with preference to forgo the incorporation of a separate catalyst.

Stage (1b) is preferably carried out at an applied voltage in a range from 55 to 400 V or in a range from 75 to 400 V or in a range from 95 to 400 V or in a range from 115 to 390 V or in a range from 135 to 370 V or in a range from 155 to 350 V or in a range from 175 to 330 V or in a range from 195 to 310 V or in a range from 215 to 290 V.

In stage (1 b), preferably, in a time interval in the range from 0 to 300 seconds after the end of the implementation of stage (1a), a voltage in the range from 50 to 400 V is applied, preferably relative to an inert counterelectrode, but with the proviso that this voltage applied in stage (1b) is greater by at least 10 V than the voltage applied before in stage (1a). Within the implementation of stage (1b), this voltage is preferably maintained for a time in the range from 10 to 300 seconds, preferably in the range from 30 to 240 seconds, at not less than a value within the stated voltage range from 50 to 400 V, subject to the proviso stated above.

The voltage applied in stage (1b) is preferably applied over a duration of at least 10 seconds or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1b).

In one preferred embodiment, the voltage applied in stage (1b) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage increase from stage (1a) to stage (1b) may take place "suddenly", in other words, for example, by corresponding switching over on a rectifier, this requiring a certain technically related minimum time to attain the target voltage. The voltage increase may alternatively take place in the form of a ramp, in other words at least approximately continuously over a selectable period, as for example of up to 10, 20, 30, 40, 50, 60, 120, or 300 seconds. A preferred ramp is of up to 120 seconds, more preferably of up to 60 seconds. Also possible is a voltage increase in steps, in which case a certain holding time at the voltage is preferably observed for each of these voltage steps, of 1, 5, 10, or 20 seconds, for example. Also possible is a combination of ramps and steps.

The indication of a period such as, for example, of a period in the range from 10 to 300 seconds for the application of the voltage in stage (1b) in a range from 50 to 400 V may mean that this voltage is held constant during the stated period. Alternatively, however, the voltage may also adopt different values during the deposition time within stage (1b), within the stated minimum and maximum values in the range from 50 to 400 V—for example, it may swing back and forth or increase in a ramp or in steps from the minimum to the maximum deposition voltage.

The voltage, i.e., deposition voltage, in stage (1b) may also be regulated in the form of pulses, with times without current and/or with a deposition voltage below the minimum level between two pulses. The pulse duration may be situated, for example, in the range from 0.1 to 10 seconds. The "period" for the deposition is then considered preferably to be the sum of the durations in which the deposition voltage lies within the stated maximum and minimum levels in the implementation of step (1b). Ramps and pulses may also be combined with one another.

Further Optional Method Steps

The method of the invention optionally further comprises a step (2), preferably following step (1), which as set out above entails two stages (1a) and (1b), as follows:

(2) contacting the substrate at least partly coated with the coating composition (A) with an aqueous sol-gel composition prior to curing of the deposited coating composition (A).

The skilled person knows the terms "sol-gel composition", "sol-gel", and the preparation of sol-gel compositions and sol-gels, from—for example—D. Wang et al., Progress in Organic Coatings 2009, 64, 327-338 or S. Zheng et al., J. Sol-Gel. Sci. Technol. 2010, 54, 174-187.

An aqueous "sol-gel composition" in the sense of the present invention is preferably an aqueous composition prepared by reacting at least one starting compound with water, with hydrolysis and condensation, this starting compound having at least one metal atom and/or semimetal atom such as $M^1$ and/or $M^2$, for example, and having at least two hydrolyzable groups such as, for example, two hydrolyzable groups $X^1$, and further, optionally, having at least one nonhydrolyzable organic radical such as $R^1$, for example. The at least two hydrolyzable groups here are preferably each bonded directly to the at least one metal atom and/or at least one semimetal atom present in the at least one starting compound, in each case by means of a single bond. Because of the presence of the nonhydrolyzable organic radical such as $R^1$, for example, a sol-gel composition of this kind used in accordance with the invention may also be termed a "sol-gel hybrid composition".

The aqueous sol-gel composition used in accordance with the invention in the optional step (2) is preferably obtainable by reaction of
at least one compound $Si(X^1)_3(R^1)$,
where $R^1$ therein is a nonhydrolyzable organic radical which has at least one reactive functional group selected from the group consisting of primary amino groups, secondary amino groups, epoxide groups, and groups which have an ethylenically unsaturated double bond,
more particularly at least one compound $Si(X^1)_3(R^1)$ where $R^1$ therein is a nonhydrolyzable organic radical which has at least one epoxide group as a reactive functional group, and in which $X^1$ is a hydrolyzable group such as an $O-C_{1-6}$ alkyl group, for example, and, moreover,
optionally at least one further compound $Si(X^1)_3(R^1)$ where $R^1$ therein is a nonhydrolyzable organic radical which has at least one reactive functional group selected from the group consisting of primary amino groups and secondary amino groups, and in which $X^1$ is a hydrolyzable group such as an $O-C_{1-6}$ alkyl group, for example,
and optionally at least one compound $Si(X^1)_4$ in which $X^1$ is a hydrolyzable group such as an $O-C_{1-6}$ alkyl group, for example,
and optionally at least one compound $Si(X^1)_3(R^1)$,
where $R^1$ therein is a nonhydrolyzable organic radical which has no reactive functional group, such as a $C_{1-10}$ alkyl radical for example, and in which $X^1$ is a hydrolyzable group such as an $O-C_{1-6}$ alkyl group, for example,
and optionally at least one compound $Zr(X^1)_4$ in which $X^1$ is a hydrolyzable group such as an $O-C_{1-6}$ alkyl group, for example,
with water.

The method of the invention preferably further comprises a step (3), which preferably follows steps (1) and optionally (2), as follows:
(3) rinsing the substrate coated at least partly with the aqueous coating composition (A), obtainable after step (1) or step (2), with water and/or with ultrafiltrate, The term "ultrafiltrate" or "ultrafiltration", particularly in connection with electrodeposition coating, is familiar to the skilled person and is defined, for example, in Römpp Lexikon, Lacke and Druckfarben, Georg Thieme Verlag 1998.

The implementation of step (3) permits the recycling of excess constituents of the inventively employed aqueous coating composition (A), present after step (1) on the at least partly coated substrate, into the dip-coating bath.

The method of the invention may further comprise an optional step (4), which preferably follows steps (1), optionally (2), preferably (3), namely a step (4) of
(4) contacting the substrate at least partly coated with the aqueous coating composition (A), obtainable after step (1) or step (2) or step (3), with water and/or ultrafiltrate, preferably over a duration of 30 seconds up to one hour, more preferably over a duration of 30 seconds up to 30 minutes.

The method of the invention may further comprise an optional step (4a), which for example follows step (1), more particularly stage (1b), or (2) or (3) or (4), namely a step (4a) of
(4a) contacting the substrate at least partly coated with the aqueous coating composition (A), obtainable after step (1) or step (2) or step (3) or step (4), with an aqueous solution or dispersion, preferably an aqueous solution, of at least one crosslinking catalyst (V), preferably of at least one crosslinking catalyst (V) which is suitable for crosslinking the reactive functional groups of the binder (A1), more particularly of an epoxide-based polymeric resin and/or acrylate-based polymeric resin used as binder (A1).

The aqueous solution of the at least one crosslinking catalyst (V) is preferably an aqueous solution of a bismuth compound such as, for example, an aqueous solution comprising a compound containing trivalent bismuth. During the implementation of the optional step (4a), a cathodic voltage relative to an anode is preferably applied to the electrically conductive substrate used, more preferably in a range from 4 V to 100 V. Carrying out step (4a) permits efficient crosslinking in the case where too small an amount of component (A3a) remains in the coating composition after implementation of stage (1a) of step (1) to be deposited in stage (1b). The optional step (4a), though possible in principle, is not preferred, however, because indeed a crosslinking catalyst is already present by way of component (A3), preferably (A3a), and so the advantage exists of being able to do without the addition of a separate crosslinking catalyst.

In one preferred embodiment the method of the invention further comprises at least one step (5), which preferably follows step (1) and/or (2) and/or (3) and/or (4) and/or (4a), but is preferably carried out after an optional step (6), described below, namely:
(5) applying at least one further coating film to the substrate coated at least partly with the inventively employed aqueous coating composition (A) and obtainable after step (1) and/or (2) and/or (3) and/or (4) and/or (4a).

By means of step (5) it is possible for one or more further coating films to be applied to the substrate at least partly coated with the coating composition (A) and obtainable after step (1) and/or (2) and/or (3) and/or (4) and/or (4a). If two or more coats have to be applied, step (5) may be repeated often accordingly. Examples of further coating films for application are, for example, basecoat films, surfacer films and/or single-coat or multicoat topcoat films. The aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, can be cured, this curing preferably taking place as described below as per step (6), before a further coat is applied such as a basecoat film, surfacer film and/or a single-coat or multicoat topcoat film. Alternatively, however, the aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, may not be cured, but instead firstly a further coat may be applied such as a basecoat film, surfacer film and/or a single-coat or multicoat topcoat film ("wet-on-wet method"). In this case, following application of this or these further coat(s), the overall system thus obtained is cured, it being possible for this curing to take place as described below, preferably in accordance with a step (6).

In one preferred embodiment the method of the invention further comprises at least one step (6), as follows:
(6) curing the aqueous coating composition (A) applied at least partly to the substrate after step (1) and/or optionally (2) and/or (3) and/or (4) and/or (4a), or the coating applied at least partly to the substrate after step (1) and/or optionally (2) and/or (3) and/or (4) and/or (4a) and/or (5).

Step (6) of the method of the invention is carried out preferably by means of baking after step (1) or optionally (2) or optionally only after at least one further step (5). Step (6) takes place preferably in an oven. The curing here takes place preferably at a substrate temperature in the range from 140° C. to 200° C., more preferably in a range from 150° C. to 190° C., very preferably in a range from 160° C. to 180° C. Step (6) takes place preferably over a duration of at least 2 minutes to 2 hours, more preferably over a duration of at least 5 minutes to 1 hour, very preferably over a duration of at least 10 minutes to 30 minutes.

At Least Partly Coated Substrate

A further subject of the present invention is an electrically conductive substrate coated at least partly with the aqueous coating composition (A) of the invention, or an at least partly coated electrically conductive substrate which is obtainable by means of the method of the invention for at least partly coating an electrically conductive substrate with a coating composition of the invention, thus preferably with an electrocoat material.

A further subject of the present invention is a preferably metallic component or preferably metallic article each produced from at least one such substrate.

Such articles may be, for example, metal strips. Components of this kind may also however—and preferably in the context of the present invention—be bodies and bodywork parts of vehicles such as automobiles, trucks, motorcycles, buses, and coaches, and components of electrical household products, or else components from the area of apparatus claddings, façade claddings, ceiling claddings, or window profiles.

The present invention is described hereinafter by a number of examples.

Methods of Determination

1. Salt Spray Mist Testing to DIN EN ISO 9227 NSS

The salt spray mist test is used for determining the corrosion resistance of a coating on a substrate. In accordance with DIN EN ISO 9227 NSS (date: June 2017), the salt spray mist test is carried out for corresponding coated electrically conductive substrates, namely cold-rolled steel (CRS). The samples for investigation here are in a chamber in which there is continuous misting with a 5% common salt solution with a controlled pH in the range from 6.5 to 7.2 at a temperature of 35° C. over a duration of 1008 hours. The mist deposits on the samples under investigation, covering them with a corrosive film of salt water.

Prior to the salt spray mist test to DIN EN ISO 9227 NSS, the coatings on the samples under investigation are scored down to the substrate with a blade incision, allowing the samples to be investigated for their level of under-film corrosion (undermining) to DIN EN ISO 4628-8 (date: Mar. 1, 2013), since the substrate corrodes along the score line during the DIN EN ISO 9227 NSS salt spray mist test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

2. VDA Alternating Climate Test to VDA DIN EN ISO 11997-1 (January 2018, cycle B)

This alternating climate test is used for determining the corrosion resistance of a coating on a substrate. The alternating climate test is carried out for the correspondingly coated substrate, namely cold-rolled steel (CRS). The alternating climate test here is carried out in 10 cycles. One cycle here consists of a total of 168 hours (1 week) and encompasses a) 24 hours of salt spray mist testing as per DIN EN ISO 9227 NSS (date: Sep. 1, 2012),
b) followed by 8 hours of storage, including heating, as per DIN EN ISO 6270-2 of September 2005, AHT method,
c) followed by 16 hours of storage, including cooling, as per DIN EN ISO 6270-2 of September 2005, AHT method,
d) 3-fold repetition of b) and c) (hence in total 72 hours), and
e) 48 hours of storage, including cooling, with an aerated climate chamber as per DIN EN ISO 6270-2 of September 2005, AHT method.

The respective coating on the samples under investigation is scored down to the substrate with a bladed incision prior to the implementation of the alternating climate test, thus allowing the samples to be investigated for their level of under-film corrosion (undermining) to DIN EN ISO 4628-8 (date: Mar. 1, 2013), since the substrate corrodes along the score line during the performance of the alternating climate test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

3. Alternating Climate Test PV 1210

This alternating climate test PV 1210 is used for determining the corrosion resistance of a coating on a substrate. The alternating climate test is carried out for corresponding coated electrically conductive substrates composed of hot-dip-galvanized steel (HDG). The alternating climate test here is carried out in 30 cycles. One cycle (24 hours) here consists of 4 hours of salt spray mist testing as per DIN EN ISO 9227 NSS (June 2017), 4 hours of storage, including cooling as per DIN EN ISO 6270-2 of September 2005 (AHT method) and 16 hours of storage, including heating, as per DIN EN ISO 6270-2 of September 2005, AHT method, at 40±3° C. and at atmospheric humidity of 100%. After each 5 cycles there is a pause of 48 hours, including cooling, as per DIN EN ISO 6270-2 of September 2005, AHT method. 30 cycles therefore correspond to a total duration of 42 days.

The respective coating on the samples under investigation is scored down to the substrate with a bladed incision prior to the implementation of the alternating climate test, thus allowing the samples to be investigated for their level of under-film corrosion (undermining) to DIN EN ISO 4628-8 (date: Mar. 1, 2013), since the substrate corrodes along the score line during the performance of the alternating climate test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

4. Copper-Accelerated Acetic Acid Salt Spray Mist Testing to DIN EN ISO 9227 CASS The copper-accelerated acetic acid salt spray mist test as well is used for determining the corrosion resistance of a coating on a substrate. The copper-accelerated acetic acid salt spray mist test is carried out, in accordance with DIN EN ISO 9227 CASS, for correspondingly coated, electrically conductive substrates of aluminum (AA6014 (ALU)). The samples under investigation are in a chamber in which there is continuous misting with a 5% common salt solution of controlled pH at a temperature of 50° C. over a duration of 240 hours, with copper chloride and acetic acid added to the salt solution. The mist deposits on the samples under investigation, covering them with a corrosive film of salt water.

The respective coating on the samples under investigation is scored down to the substrate with a bladed incision prior to the copper-accelerated acetic acid salt spray mist test as per DIN EN ISO 9227 CASS, thus allowing the samples to be investigated for their level of under-film corrosion (undermining) to DIN EN ISO 4628-8, since the substrate corrodes along the score line during the DIN EN ISO 9227 CASS copper-accelerated acetic acid salt spray mist test. As a result of the progressive process of corrosion, the coating is undermined to a greater or lesser extent during the test. The degree of undermining in [mm] is a measure of the resistance of the coating to corrosion. The average undermining level stated in the results later on below represents the average value of the individual values from three to five different panels assessed, with each individual value for a panel in turn being an average value of the undermining levels at 11 measurement points on the panel.

In addition to the undermining, the number of delamination sites on the overall surface of the panel is also reported (these being, then, nucleation points at which detachment of the coating has taken place). This number as well is stated as the average of the individual numbers from three to five individual panels.

5. Atomic Emission Spectrometry (ICP-OES) for Determining the Amounts of (A3a), (A3b), (A4), (A5), (A6) such as Especially (A6a)

The amount of certain elements in a sample under investigation, such as the bismuth content, for example, is determined using inductively coupled plasma atomic emission spectrometry (ICP-OES) according to DIN EN ISO 11885 (date: Sep. 1, 2009).

A fundamental distinction is made here between components which are present in a form dissolved in the coating composition (A) (for example, (A3a)) and those which are present in a form undissolved in (A) (for example (A3b)). The total fraction of an element, bismuth for example, in the coating composition (A) is then obtained from the sum total of the element present in dissolved form and the element present in undissolved form. The elements present in dissolved form are determined from ultrafiltrate as follows. An ultrafiltration is carried out on a coating composition (A) at a temperature of 20° C. for the duration of six hours (ultrafiltration in a circuit; ultrafiltration membrane: Nadir, PVDF, RM-UV 150T). A sample is taken from the permeate or ultrafiltrate. This sample is subjected to thermal excitation in an argon plasma generated by a high-frequency field, and the light emitted due to electron transitions becomes visible as a spectral line of the corresponding wavelength, and is analyzed using an optical system. There is a linear relation here between the intensity of the light emitted and the concentration of the element in question. Prior to implementation, using known element standards (reference standards), the calibration measurements are carried out as a function of the particular sample under investigation. These calibrations can be used to determine concentrations of unknown solutions such as the concentration of the amount of (A3a) or (A4) in the ultrafiltrate. It is assumed here that the components present in dissolved form in (A) are transferred completely into the ultrafiltrate.

The above-described method of determination can be used, moreover, to determine the total fraction of the elements in the coating composition (A). For sample preparation in this case, a sample of the coating composition (A) is taken and this sample is digested by microwave to give a sample solution amenable to ICP-OES analysis: here, a sample of the coating composition (A) (or else of a comparative composition) is weighed out, and the volatile constituents of this sample are removed by heating with a linear temperature increase from 18° C. to 130° C. over the course of one hour. An amount of up to 0.5 g of this resulting sample is admixed with a 1:1 mixture of nitric acid (65% strength) and sulfuric acid (96%) (5 ml of each of the stated acids) and then microwaved digestion is carried out using an instrument from Berghof (Speedwave IV instrument). During the digestion, the sample mixture is heated to a temperature of 250° C. over the course of 20 to 30 minutes, and this temperature is held for 10 minutes. Following the digestion, the remaining sample mixture should be a clear solution without a solids fraction. Using ICP-OES in accordance with DIN EN ISO 11885, it is then possible to determine the total amounts of the respective elements in the sample.

When the fraction present in dissolved form is subtracted from this total fraction, the dissolved fraction being determined as explained above, the result is the fraction of component that is present in undissolved form.

Of course, where the amounts of the constituents used that comprise the element for quantification are directly known, an arithmetic determination of the total content is also possible.

6. Verifying the Surface Structure of Coatings Produced

The surface structure or surface quality was verified visually. In this case, the coatings arranged on substrates were inspected visually by skilled workers for the homogeneity of the coating. A smooth surface, containing only slight irregularities or none, was awarded a score of 1. A slight to moderate irregularity, possibly including specks to a limited extent, is awarded a rating of 3. More significant irregularities, with a level which is no longer acceptable, are given a rating of 5.

7. Dynamic Mechanical Analysis (DMA)

DMA analysis was used to determine the "onset temperature" (the temperature at which crosslinking begins) and the offset times (time to the end of crosslinking) for corresponding coating compositions (A). This method makes use of the fact that the dynamic mechanical (more precisely, viscoelastic) properties of the samples change accordingly on macroscopic crosslinking. Specifically, the aforementioned parameters were derived on the basis of the change in the loss factor tan δ and/or in the storage modulus E'.

The coating compositions were applied to carbon fiber nets (CW245). Sample strips were cut from these nets and clamped in with a free area of 10 mm×20 mm. The DMA measurements were carried out in the "tensile mode—tension off" mode (measuring conditions: amplitude 0.006 mm, frequency 1 Hz; onset temperature: 2° C./min from room temperature to 110° C., 1° C./min from 110° C. to 200° C./offset times: (a) 22° C./min from 25° C. to 135° C., 5° C./min from 135° C. to 160° C., 60 min isothermal 160° C. (b) 25° C./min from 25° C. to 150° C., 5° C./min from 150° C. to 175° C., 60 min isothermal 175° C. (c) 28° C./min from 25° C. to 165° C., 5° C./min from 165° C. to 190° C., 60 min isothermal 190° C.).

The evaluation was made as follows: onset temperature: extrapolated onset temperature situation of the network structure from tan δ profile. Offset time: extrapolated offset time [min] of the network structure from E' profile in a linear plot.

8. Glass Transition Temperature

Also investigated was the glass transition temperature of coatings produced on substrates (MDSC TA Instruments Q2000; from 0° C.-160° C., modulation 1° C., 60 s, 3° C./min, purge gas: nitrogen 50 ml/min; evaluation: glass transition temperature [° C.] from the midpoint of the rev. HF curve). The glass transition temperature of a coating film cured under defined conditions allows a statement to be made about crosslinking density and hence the quality of crosslinking of the coating film.

The examples which follow serve to elucidate the invention, but should not be interpreted as imposing any restriction.

Unless otherwise noted, the figures in percent hereinafter are in each case percentages by weight.

INVENTIVE AND COMPARATIVE EXAMPLES

1a. Production of Inventive Aqueous Coating Compositions and of a Comparative Coating Composition The CathoGuard® 800 pigment paste from BASF that is used for producing the exemplary inventive coating compositions and the comparative coating composition V1 below comprises bismuth subnitrate. The skilled person knows of the production of such pigment pastes from, for example, DE 10 2008 016 220 A1 (page 7, table 1, variant B).

Comparative Coating Composition (A)V1

2129 g of an aqueous dispersion of a binder and a crosslinking agent (commercially available product CathoGuard® 800 from BASF with a solids content of 38.0 wt %), 302 g of a pigment paste (commercially available product CathoGuard® 800 from BASF with a solids content of 65.5 wt %), 1258 g of water, and 1309.5 g of a solution of bicine (N,N'-bis(2-hydroxyethyl)glycine) in water (59.5 g bicine+ 1250 g water) were combined to form a comparative coating composition (A)V1. In this case the bicine solution was prepared first and then added to the initial charge, comprising the binder and the paste. The mixture was stirred at 18-23° C. for 24 hours.

Coating Composition (A)E1

The coating composition (A)E1 was produced as for (A)V1, except that additionally 250 g of a solution of lithium acetate dihydrate in water (7.2 g of lithium acetate dihydrate in 892.8 g of water, then 250 g of this solution) were admixed and the amount of water added was reduced correspondingly by 250 g. The fraction of lithium (A4) in (A)E1 therefore corresponded to a fraction of 27 ppm, based on the total amount of (A)E1.

Coating Composition (A)E2

The coating composition (A)E2 was produced as for (A)E1, except that additionally 250 g of a solution of copper(II) nitrate trihydrate in water (7.6 g of copper(II) nitrate trihydrate +992.4 g of water, then 250 g of this solution) were admixed and the amount of water added was reduced correspondingly by 250 g. The fraction of copper (A6a) in (A)E2 therefore corresponded to a fraction of 100 ppm, based on the total amount of (A)E2.

For all three stated coating compositions, determinations were made of the amounts of dissolved lithium (A4), the amount of dissolved phosphorus (A5) (for the control), the amount of dissolved copper, and the amounts of bismuth (A3a) and (A3b). Table 1a provides an overview of the resultant inventive coating compositions (A)E1 and (A)E2 and also of the comparative coating composition (A)V1. Also stated, where appropriate, are the pH and the conductivity. The respective pH values and conductivities of table 1a are each ascertained, if determined at all, at a temperature in the region of 20° C.

TABLE 1a

|  | (A)V1 | (A)E1 | (A)E2 |
|---|---|---|---|
| Fraction (A3a)* | 980 ppm | 980 ppm | 980 ppm |
| Fraction (A3b)* | 1520 ppm | 1520 ppm | 1520 ppm |
| Fraction (A4) | — | 27 ppm | 27 ppm |
| Fraction (A5) | — | — | — |
| Fraction (A6a) | — | — | 100 ppm |
| pH | 5.44 | 5.58 | 5.47 |
| Conductivity | 2.03 mS/cm | 2.26 mS/cm | 2.26 mS/cm |

*Amounts determined by way of example for (A)E2; for (A)V1 and (A)E1 exactly the same amounts and fractions of the bismuth-containing components were used.

1b. Production of Further Coating Compositions with Varying Fraction of Lithium (A4)

Further coating compositions were produced as for (A)E2, but with variation in the fraction of lithium (A4). For this purpose, the abovementioned solution of lithium acetate dihydrate in water (7.2 g of lithium acetate dihydrate in 892.8 g of water) was admixed in correspondingly different amounts. By varying the fraction of water added, the total amount of sample produced was again kept constant.

Table 1 b provides an overview of the coating compositions produced. For greater ease of comparison, the coating composition (A)E1 is also shown.

TABLE 1b

|  | (A)E2 | (A)E1 | (A)E3 | (A)E4 | (A)E5 | (A)V2 |
|---|---|---|---|---|---|---|
| Fraction (A4) | 17 ppm | 21 ppm | 27 ppm | 38 ppm | 49 ppm | 350 ppm |
| pH | 5.24 | 5.34 | 5.58 | 5.60 | 5.58 | 5.96 |
| Conductivity [mS/cm] | 2.47 | 2.47 | 2.26 | 2.40 | 2.58 | 4.55 |

1c. Production of Further Coating Compositions with Varying Fraction of Lithium and Phosphorus Further coating compositions were produced as for (A)E1, but using lithium phosphate instead of a solution of lithium acetate dihydrate in water. The lithium phosphate here was incorporated by grinding as a constituent of the pigment paste. Table 1c provides an overview of these coating compositions. For greater ease of comparison, the coating composition (A)E1 is also shown.

TABLE 1c

|  | (A)E1 | (A)E6 | (A)E7 | (A)E8 | (A)E9 |
|---|---|---|---|---|---|
| Fraction lithium phosphate | — | 100 ppm | 150 ppm | 250 ppm | 350 ppm |
| Fraction (A4) | 27 ppm | 27 ppm | 27 ppm | n.d. | n.d. |
| Fraction (A5) | — | 27 ppm | 40 ppm | 67 ppm | 93.5 ppm |
| pH | 5.58 | 5.31 | 5.24 | 5.50 | 5.60 |
| Conductivity [mS/cm] | 2.26 | 2.34 | 2.29 | 2.32 | 2.45 | n.d. = not determined

2. Production of Coated Electrically Conductive Substrates by Means of One of the Coating Compositions (A)

The aqueous coating compositions described under 1. were each applied as dipped coatings to various substrates. Each of the compositions here is applied to the various substrates immediately after its production as described above.

Three kinds of metal test panels are used, these being T1 (hot-dip-galvanized steel (HDG)) and T2 (aluminum (ALU)) and also T3 (cold-rolled steel (CRS)).

These panels are first of all each cleaned by immersion into a bath comprising an aqueous solution comprising the commercially available product Gardoclean S5160 from Chemetall and also water (97.7 wt %) for a duration of 2 minutes at a temperature of 60° C.

The substrates cleaned in this way are subsequently rinsed with water.

Immediately thereafter, one of the inventively employed aqueous coating compositions is applied to each panel T1, T2 or T3, with the respective panel being immersed in each case into a corresponding dip-coating bath comprising one of the compositions. This dip-coating bath has a respective temperature of 30° C.

Coating in the dip-coating bath here is carried out by means of a two-stage deposition step and coating step, which provides two stages (1a) and (1 b), where first of all, galvanostatically, current strengths in the range from 0.02 to 0.32 A or, potentiostatically, a voltage of 4 V are applied, in each case over a duration of 120 seconds (corresponding to stage (1a)).

Subsequent to this, for the substrates obtained after stage (1a), stage (1b) of step (1) of the method of the invention is carried out, with application either potentiostatically of a voltage of 4 V or galvanostatically of current strengths in the range of 0.12 to 0.28 A, which in each case within stage (1b) are increased continuously, linearly, to a voltage in the range of 200-220 V, in each case over a duration of 30 seconds, by means of a voltage ramp. This respective voltage is then maintained for a duration of 90 seconds (hold time) to give (after the subsequent curing) a coating of the respective substrate in a dry film thickness of 17 to 22 micrometers. The test panels are subsequently cured for 25 minutes in an oven (175° C. unless explicitly stated otherwise).

3. Investigation of the Corrosion Prevention Effect of the Coated Substrates

The substrates coated with one of the coating compositions are investigated by means of the measurement methods described earlier on above.

3a Investigation of Coatings Produced Using the Coating Compositions Listed in Table 1a The coatings produced using the coating compositions listed in table 1a were investigated for their corrosion resistance. It should be pointed out that outstanding resistance is achieved for average underminings of around 1 mm. Moreover, differences in the absolute range by about 1 mm are difficult to evaluate technically and are therefore not meaningful. Table 3a shows the results.

TABLE 3a

|  | Coating composition | | |
|---|---|---|---|
|  | (A)V1 | (A)E1 | (A)E2 |
|  | Coating | | |
|  | B(A)V1 | B(A)E1 | B(A)E2 |
| Average undermining NSS (substrate CRS) [mm] | 4.2 | 3.7 | 2.9 |
| Average undermining VDA (substrate CRS) [mm] | 5.7 | 4.9 | 3.9 |
| Average undermining PV1210 (substrate HDG) [mm] | 6.7 | 6.8 | 5.5 |
| Average undermining CASS (substrate ALU) [mm] | 0.8 | 1.2 | 0.4 |
| Delamination number NSS (substrate ALU) | 124.8 | 3.2 | 3.8 |

The results show that the system B(A)E1 in comparative to the system B(A)V1 exhibits slightly improved corrosion resistance on steel substrates. While the undermining properties on aluminum are very good for both B(A)E1 and B(A)V1, the number of delamination points on the panel in the case of B(A)V1 is extremely high, which means that there are numerous nuclei for further corrosive attack. In contrast to this, the number of such delamination points in the B(A)E1 system is extremely small. The inventive system B(A)E2 is further improved in relation to the corrosion inhibition properties.

In total it is found that the inventive system is ideally suited to offering outstanding corrosion prevention in relation to both common metal types, steel and aluminum, and is therefore ideally suited to substrates in which both types of metal are present.

3b Investigation of Coatings Produced Using the Coating Compositions Listed in Table 1 b The coatings produced using the coating compositions listed in table 1 b were investigated for their surface structure/surface quality. Table 3b shows the results.

It was indeed possible to deposit the coating composition (A)V2 by the method of electrophoretic deposition coating. The result, however, was a disturbed surface with lots of holes, which was unacceptable.

TABLE 3b

|  | Coating composition | | | | | |
|---|---|---|---|---|---|---|
|  | (A)E2 | (A)E1 | (A)E3 | (A)E4 | (A)E5 | (A)V2 |
| Coating | B(A)E2 | B(A)E1 | B(A)E3 | B(A)E4 | B(A)E5 | B(A)E6 |
| Fraction (A4) | 17 ppm | 21 ppm | 27 ppm | 38 ppm | 49 ppm | 350 ppm |
| Surface quality | 1 | 1-2 | 1-2 | 2-3 | 3-4 | 5 |

Furthermore, the surface quality of the coating B(A)V1 was investigated and was rated with a score of 1.

Representatively, moreover, a number of the investigations of corrosion resistance described under 3a were also carried out for the coatings B(A)E2, B(A)E3, B(A)E4, and B(A)E5. The results showed that the respective corrosion resistance is in the region of the coating B(A)E1 and is therefore better than the corrosion resistance of the coating B(A)V1.

In total the results show that the addition of lithium (A4) to the coating compositions leads on the one hand to a significantly improved corrosion resistance. On the other hand an increase in the fraction of (A4) leads to a reduced surface quality. At a fraction of (A4) of 388 ppm it was not even possible any longer to carry out electrophoretic deposition.

3c Investigation of Coatings Produced Using the Coating Compositions Listed in Table 1c The coatings produced using the coating compositions listed in table 1c were investigated for their crosslinking properties. Table 3c shows the results.

TABLE 3c

|  | (A)E1 | (A)E6 | (A)E7 | (A)E8 | (A)E9 |
|---|---|---|---|---|---|
| Fraction lithium phosphate | — | 100 ppm | 150 ppm | 250 ppm | 350 ppm |
| Fraction (A4) | 27 ppm | 18 ppm | 27 ppm | n.d. | n.d. |
| Fraction (A5) | — | 27 ppm | 40 ppm | 67 ppm | 93.5 ppm |
| Onset temperature | 147° C. | 148° C. | 150° C. | 157° C. | 155° C. |
| Offset time 160° C. | 30 min | 30 min | 36 min | 43 min | 46 min |
| Offset time 175° C. | 20 min | 20 min | 22 min | 27 min | 28 min |
| Offset time 190° C. | 15 min | 15 min | 18 min | 19 min | 18 min |
| Tg (CRS) | 88 | 80 | 77 | 56 | 52 |
| Tg (HDG) | 86 | 76 | 64 | 57 | 56 |
| Tg (ALU) | 87 | 84 | 56 | 49 | 48 |

The results show that for the preferred system of a coating composition (A) comprising a bismuth-based catalyst, the fraction of phosphorus present in the composition ought preferably to be extremely low. The reason is that, the higher the fraction of phosphorus, the poorer the crosslinkability (apparent from the higher onset temperature, the longer offset times, and the lower glass transition temperatures).

The invention claimed is:

1. An aqueous coating composition (A) for at least partly coating an electrically conductive substrate with an electrocoat material, comprising
    (A1) at least one cathodically depositable resin binder,
    (A2) at least one crosslinking agent, and
    (A3) at least 100 ppm of bismuth, based on the total weight of the coating composition (A),
    wherein
    (A4) the coating composition comprises lithium, in a form dissolved in an aqueous medium of (A), wherein said lithium is from 2.5 to 300 ppm, based on a total weight of the coating composition (A).

2. The aqueous coating composition (A) according to claim 1, wherein the fraction of lithium (A4) is from 2.5 to 250 ppm based on the total weight of the coating composition (A).

3. The aqueous coating composition (A) according to claim 1, which comprises a bismuth-based crosslinking catalyst.

4. The aqueous coating composition (A) according to claim 3, comprising the bismuth-based crosslinking catalyst in component (A3).

5. The aqueous coating composition (A) according to claim 3, wherein (A5) a fraction of phosphorus does not exceed an amount of 100 ppm based on the total weight of the coating composition (A).

6. The aqueous coating composition (A) according to claim 1, which comprises (A6) copper.

7. The aqueous coating composition (A) according to claim 6, wherein (A6a) the copper is included in a form dissolved in the aqueous medium of (A) and the amount (A6a) is from 5 to 1000 ppm, based on the total weight of the coating composition (A).

8. The aqueous coating composition (A) according to claim 1, wherein the coating composition (A) comprises a total amount of at least 300 ppm of bismuth, based on the total weight of the coating composition (A), including
    (A3a) at least 100 ppm of bismuth, based on the total weight of the coating composition (A), in a form in which it is in the aqueous medium of (A), and
    (A3b) at least 200 ppm of bismuth, based on the total weight of the coating composition (A), in a form in which it is not in the aqueous medium of (A).

9. The aqueous coating composition (A) according to claim 1, wherein the total amount of the bismuth present in the coating composition (A) is in a range from at least 500 ppm to 20 000 ppm and the coating composition (A) comprises at least one bidentate complexing agent (A3aa) suitable for the complexing of the bismuth.

10. The aqueous coating composition (A) according to claim 1, wherein the fraction of the lithium (A4) is from 12.5 to 70 ppm based on the total weight of the coating composition (A).

11. The aqueous coating composition (A) according to claim 3, wherein (A5) a fraction of phosphorus does not exceed an amount of 45 ppm based on the total weight of the coating composition (A).

12. A method for at least partly coating the electrically conductive substrate with the electrocoat material, comprising at least a step (1),
    (1) contacting the electrically conductive substrate, connected as cathode, with the aqueous coating composition (A) according to claim 1
        step (1) being carried out in at least two successive stages (Ia) and (Ib), namely
        (Ia) at an applied voltage in a range from 1 to 50 V, which is applied over a duration of at least 5 seconds, and
        (Ib) at an applied voltage in a range from 50 to 400 V, with the proviso that the voltage applied in stage (Ib) is greater by at least 10 V than the voltage applied in stage (Ia).

13. The method according to claim 12, wherein the voltage applied in stage (1a) is applied over a duration in a range from at least 5 to 300 seconds, and the voltage applied in stage (1b) in the range from 50 to 400 V takes place in a time interval of 0 to 300 seconds after implementation of stage (1a) and is maintained for a period in the range from 10 to 300 seconds at a value within the stated voltage range of 50 to 400 V.

14. The method according to claim 13, wherein the electrically conductive substrate in relation to the type of metal has different regions.

15. The method according to claim 14, wherein the aqueous coating composition (A) comprises copper, in a form (A6a) dissolved in the aqueous medium of (A), wherein the fraction of the lithium (A4) is from 12.5 to 70 ppm and the fraction of the copper (A6a) is from 20 to 250 ppm.

16. The method according to claim 13, wherein the electrically conductive substrate in relation to the type of metal has at least one region which is steel-based and at least one further region which is aluminum-based.

17. The method according to claim 14, wherein the aqueous coating composition (A) comprises copper, in a form (A6a) dissolved in the aqueous medium of (A), wherein the fraction of the lithium (A4) is from 12.5 to 50 ppm and the fraction of the copper (A6a) is from 20 to 250 ppm.

18. A coated substrate coated by the method according to claim 12.

19. A component or article, which comprises the coated substrate according to claim 18.

20. An automobile body, which comprises the coated substrate according to claim 18.

* * * * *